United States Patent
Ohhira

(10) Patent No.: US 7,302,191 B2
(45) Date of Patent: Nov. 27, 2007

(54) OPTICAL TRANSMITTER WITH TAP TYPE OPTICAL FILTERS

(75) Inventor: Risato Ohhira, Tokyo (JP)

(73) Assignee: NEC Corporation, Tokyo (JP)

(*) Notice: Subject to any disclaimer, the term of this patent is extended or adjusted under 35 U.S.C. 154(b) by 684 days.

(21) Appl. No.: 10/654,124

(22) Filed: Sep. 4, 2003

(65) Prior Publication Data

US 2004/0101318 A1 May 27, 2004

(30) Foreign Application Priority Data

Sep. 4, 2002 (JP) ............................. 2002-258358

(51) Int. Cl.
*H04B 10/04* (2006.01)

(52) U.S. Cl. .................. 398/185; 398/186; 398/188; 398/154

(58) Field of Classification Search .............. 398/183, 398/185–187, 154
See application file for complete search history.

(56) References Cited

U.S. PATENT DOCUMENTS

| 5,091,983 A * | 2/1992 | Lukosz ..................... 385/13 |
| 6,850,713 B2 * | 2/2005 | Kikuchi et al. ............ 398/201 |
| 2002/0030878 A1 * | 3/2002 | Ohhiro ...................... 359/183 |

FOREIGN PATENT DOCUMENTS

| JP | 9-43440 | 2/1997 |
| JP | 11-72756 | 3/1999 |
| JP | 2000-199880 | 7/2000 |
| JP | 2000-244414 | 9/2000 |
| JP | 2001-86070 | 3/2001 |
| JP | 2001-244894 | 9/2001 |
| JP | 2002-164850 | 6/2002 |
| JP | 2002-244171 | 8/2002 |
| JP | 2003-87201 | 3/2003 |

OTHER PUBLICATIONS

Rajiv Ramaswami, Kumar N. Sivarajan, Optical Networks: A practical perspective, 1998, Morgan Kaufmann Publishers, pp.108-112.*
Y.Miyamoto et al., "320 Gbit/s (8×40 Gbit/s) WDM transmission over 367km with 120km repeater spacing using carrier-suppressed return-to-zero format", Electronics Letters, vol. 35, No. 23, pp. 2041-2042, Nov. 11, 1999.
R.Ohhira et al., "Novel RZ signal format with alternate-chirp for suppression of nonlinear degradation in 40 Gb/s based WDM", OFC2001, WM2-1-WM2-3, Mar. 2001.

* cited by examiner

*Primary Examiner*—Leslie Pascal
(74) *Attorney, Agent, or Firm*—Young & Thompson

(57) ABSTRACT

An optical transmitter includes a continuous wave optical source for generating an optical signal having a carrier frequency component, a clock modulator for performing a clock modulation upon the optical signal using a clock signal to generate a clock-modulated signal, and a data modulator for performing a data modulation upon the clock-modulated signal using a data signal. The clock signal has a half frequency of that of the data signal. The clock modulator is constructed by a single-end type phase modulator and at least one tap type optical filter.

56 Claims, 20 Drawing Sheets

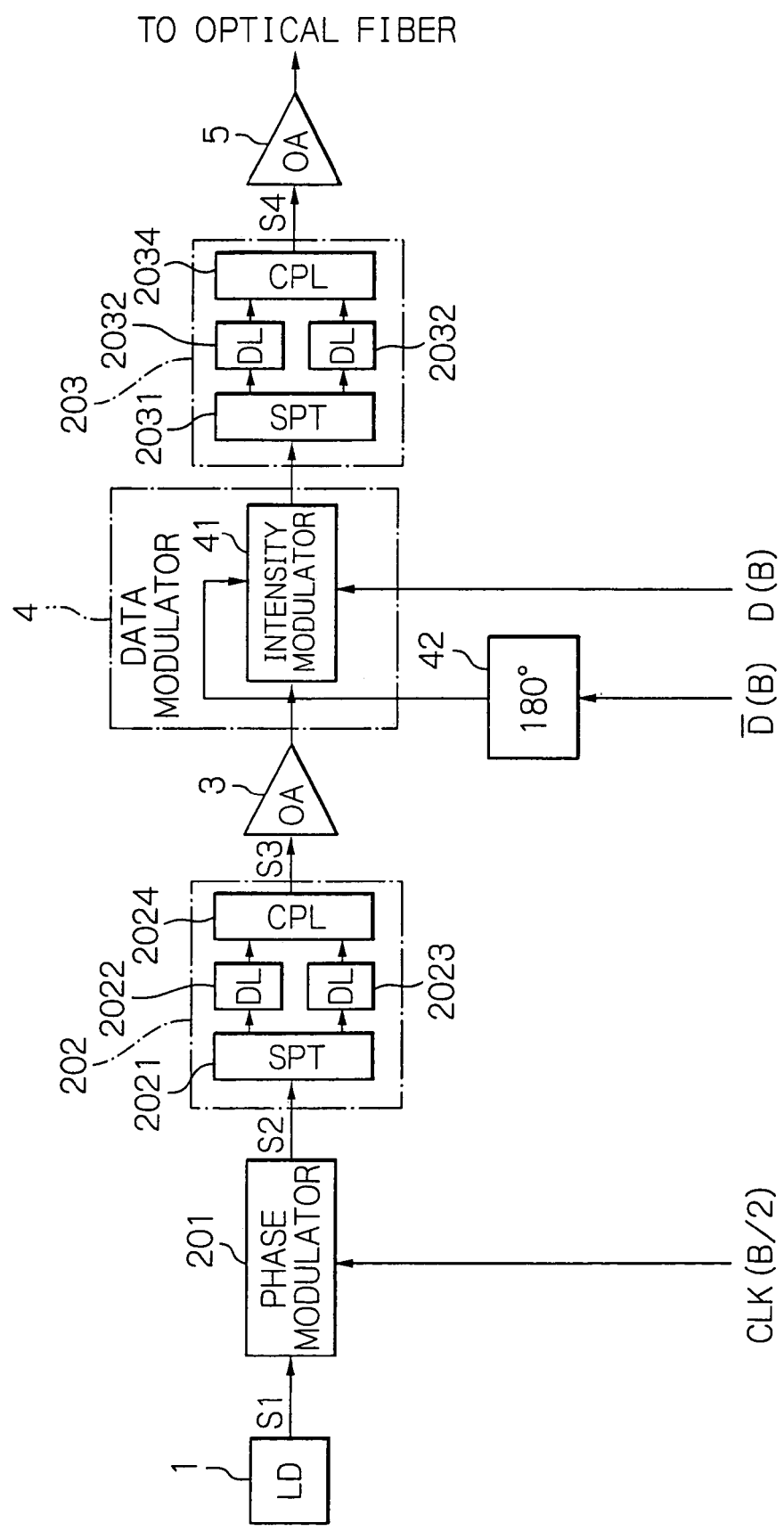

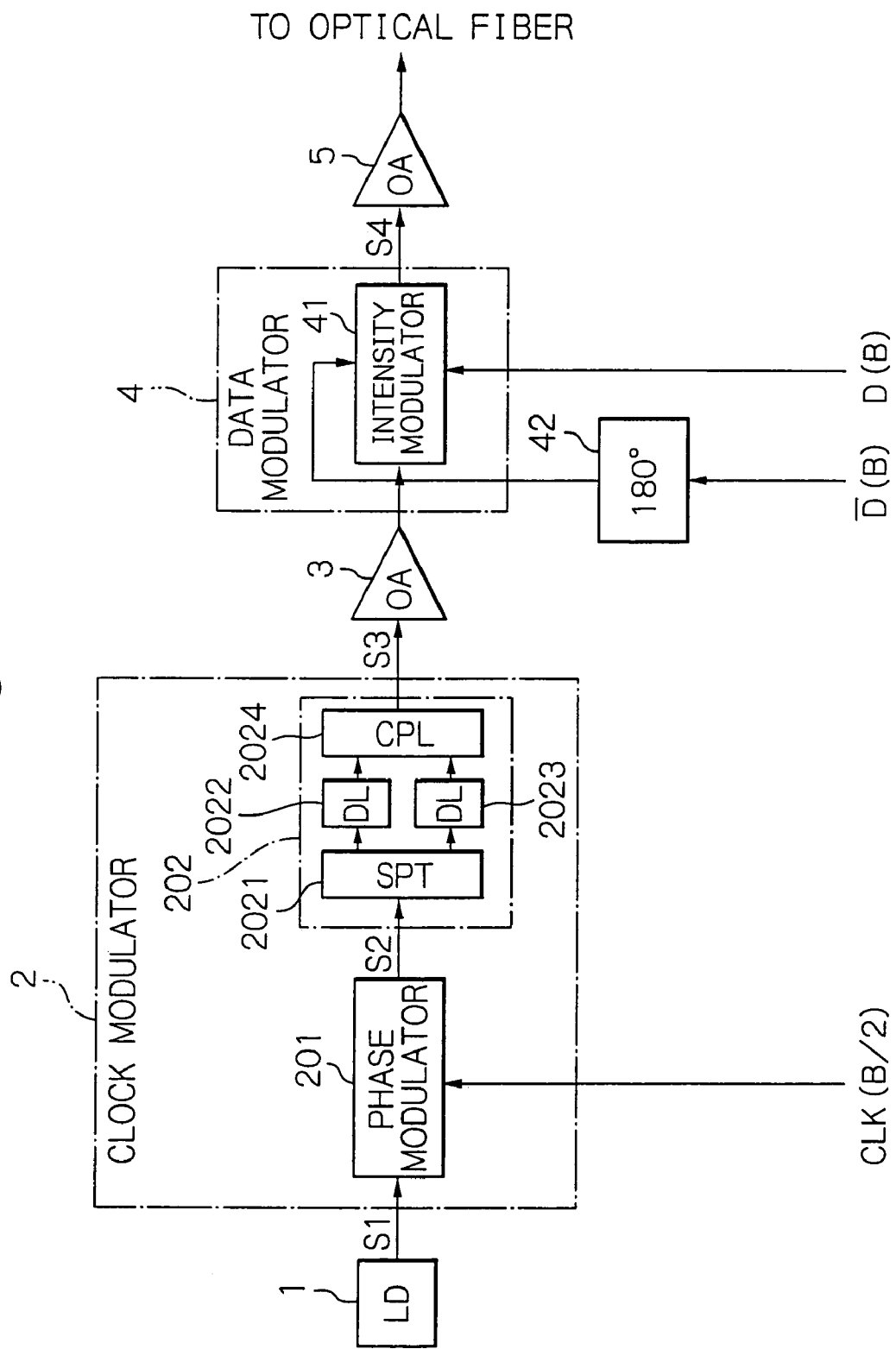

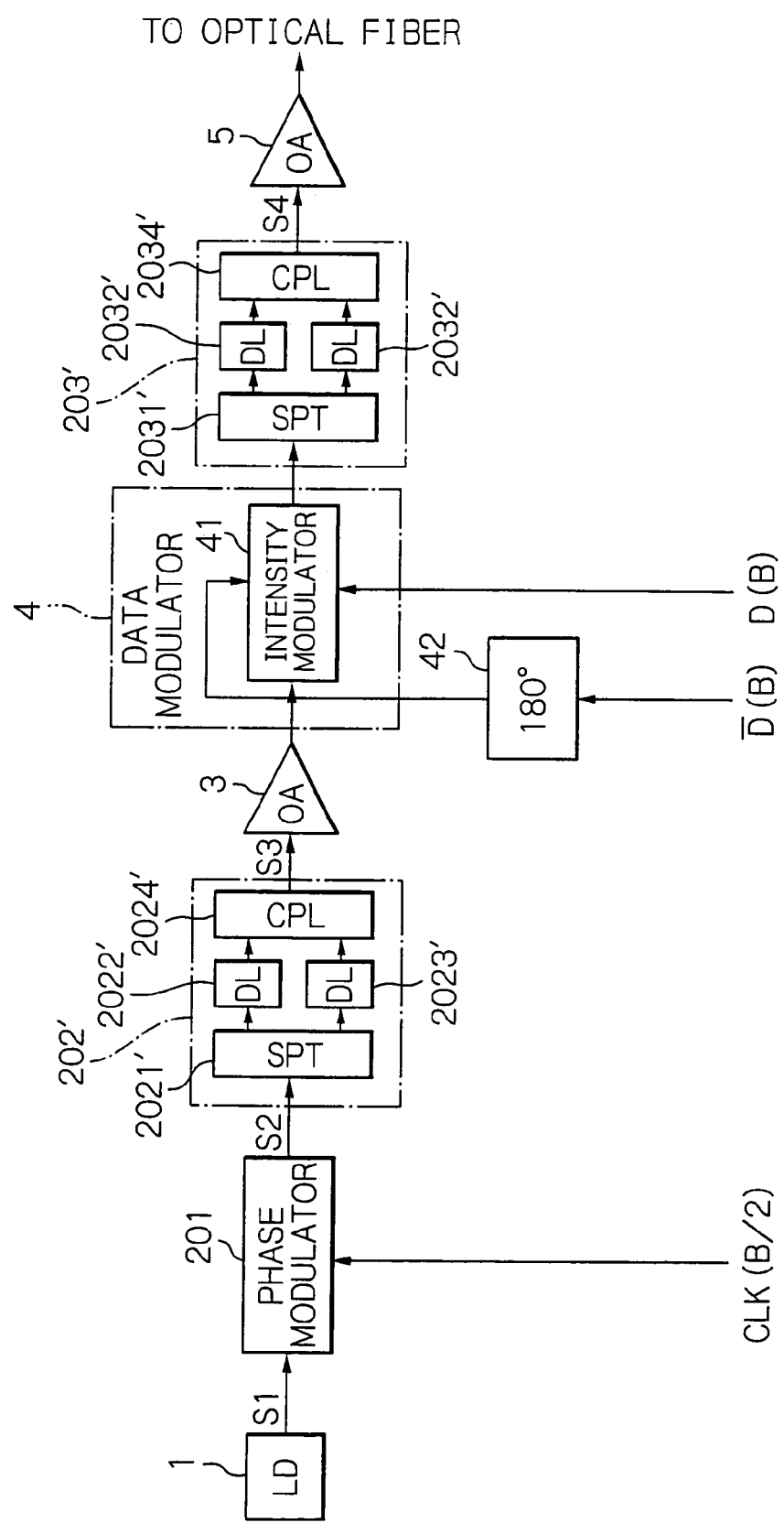

OPTICAL TRANSMITTER WITH TAP TYPE OPTICAL FILTERS

BACKGROUND OF THE INVENTION

1. Field of the Invention

The present invention relates to an optical transmitter in an optical communication system such as a wavelength division multiplexing (WDM) communication system.

2. Description of the Related Art

In a high speed optical fiber communication system, waveform distortion is caused by a synergistic effect between wavelength dispersion of a transmission line formed by optical fibers and non-linear effects such as self-phase modulation (SPM) and cross-phase modulation (XPM), so that the transmission speed characteristics would be degraded and the transmission distance would be decreased.

A first prior art optical transmitter using a conventional return-to-zero (RZ) format is constructed by a clock modulator formed by a single-end type intensity modulator for performing a clock modulation upon a carrier optical signal using a clock signal having a frequency of a bit rate of an NRZ data signal, and a data modulator for performing a data modulation upon the optical output signal of the clock modulator using the NRZ data signal. This will be explained later in detail.

In the above-described first prior art optical transmitter, however, since the spectrum bandwidth of a main lobe is relatively large, the optical spectrum of neighboring channels may be superposed onto each other in WDM systems, so that the neighboring channels easily interfere with each other. Also, to reduce the waveform distortion caused by a synergistic effect between wavelength dispersion of the optical fiber and nonlinear effects such as self-phase modulation (SPM) and cross-phase modulation (XPM), the transmitted power is preferably relatively small, which decreases the transmission distance.

A second prior art optical transmitter using a carrier-suppressed return-to-zero (CS-RZ) format includes a clock modulator formed by a push-pull type intensity modulator (see: Y. Miyamoto et al., "320 Gbit/s (8×40 Gbit/s) WDM transmission over 367 km with 120 km repeater spacing using carrier-suppressed return-to-zero format", Electronics Letters, Vol. 35, No, 23, pp. 2041-2042, Nov. 11, 1999). This also will be explained later in detail.

In the above-described second prior art optical transmitter, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is suppressed, the transmitted power can be relatively large, which upgrades the transmission speed characteristics and increases the transmission distance.

In the above-described second prior art optical transmitter, however, the adjustment of phase and amplitude between the clock signals and the adjustment of a bias voltage are very troublesome.

A third prior art optical transmitter using an alternate-chirped return-to-zero (AC-RZ) format includes a clock modulator formed by a single-end type phase modulator and an optical filter (see: R. Ohhira et al. , "Novel RZ signal format with alternate-chirp for suppression of nonlinear degradation in 40 Gb/s based WDM", OFC2001, WH2-1~WH2-3, March 2001). This also will be explained later in detail.

Even in the above-described third prior art optical transmitter, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is further suppressed, the transmitted power can be relatively large compared with the above-described second prior art optical transmitter, which further upgrades the transmission speed characteristics and further increases the transmission distance. Further, the adjustment of phase and amplitude of the clock signal and the adjustment of a bias voltage are very easy.

In the above-described third prior art optical transmitter, however, the clock modulator and the data modulator cannot be integrated into one substrate made of $LiNbO_3$ or $LiTaO_3$, because the optical filter cannot be formed on such a substrate.

SUMMARY OF THE INVENTION

It is an object of the invention to provide an optical transmitter capable of integrating a clock modulator and a data modulator into one substrate while the adjustment of phase and amplitude of a clock signal as well as the adjustment of a bias voltage is easy or unnecessary.

Another object is to provide an optical modulating method for the above-mentioned optical transmitter.

According to the present invention, an optical transmitter includes a continuous wave optical source for generating an optical signal having a carrier frequency component, a clock modulator for performing a clock modulation upon the optical signal using a clock signal to generate a clock-modulated signal, and a data modulator for performing a data modulation upon the clock-modulated signal using a data signal. The clock signal has a half frequency of that of the data signal. The clock modulator is constructed by a single-end type phase modulator and at least one tap type optical filter.

The tap type optical filter suppresses the carrier frequency component and 2n-th (n=1, 2, . . . ) double-sideband components, 3n-th (n=1, 2, . . . ) double-sideband components, 5n-th (n=1, 2, . . . ) double-sideband components, 7n-th (n=1, 2, . . . ) double-sideband components and so on.

BRIEF DESCRIPTION OF THE DRAWINGS

The present invention will be more clearly understood from the description set forth below, ad compared with the prior art, with reference to the accompanying drawings, wherein:

FIGS. 17B and 17C are block diagrams illustrating modifications of the optical transmitter of FIG. 11;

FIGS. 24B and 24C are block diagrams illustrating modifications of the optical transmitter of FIG. 18.

DESCRIPTION OF THE PREFERRED EMBODIMENTS

Before the description of the preferred embodiments, prior art optical transmitters will be explained with reference to FIGS. 1, 2A, 2B, 3A, 3B, 4, 5A, 5B, 6A, 6B, 7, 8A, 8B, 9A, 9B, 10A and 10B.

Figure 1:
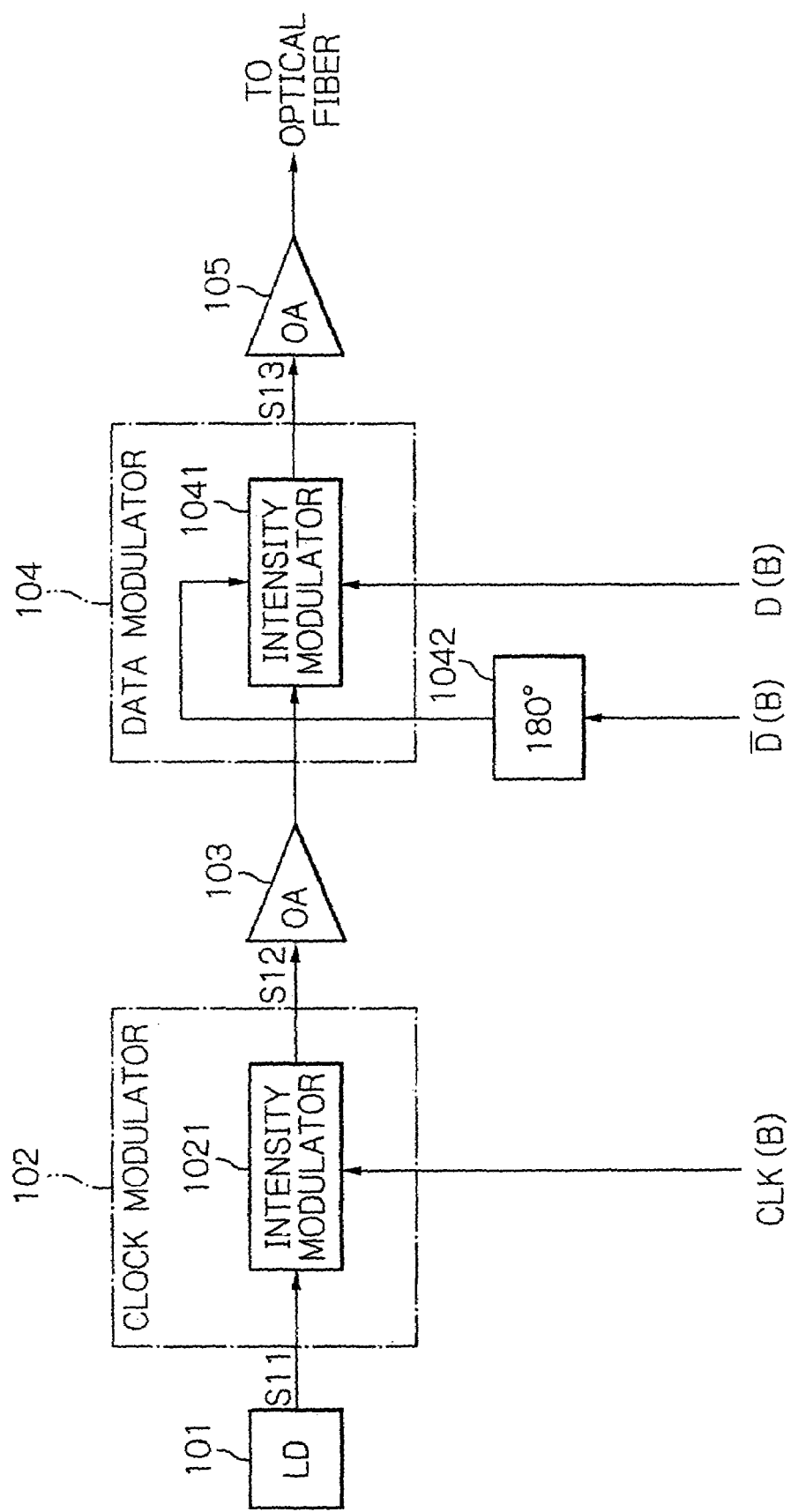
FIG. 1 is a block diagram illustrating a first prior art optical transmitter.
Figure 2A:
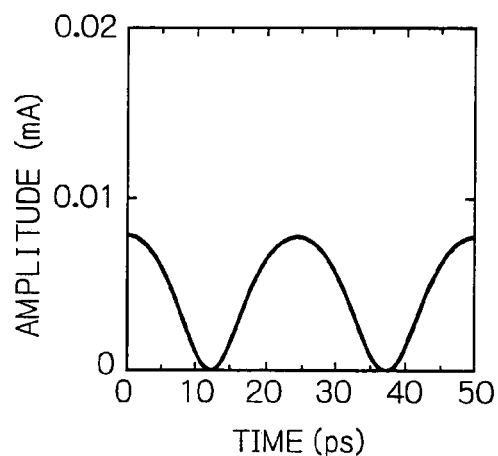
FIGS. 2A and 2B are an eye pattern and an optical spectrum, respectively, of the clock-modulated signal of FIG. 1.
Figure 2B:
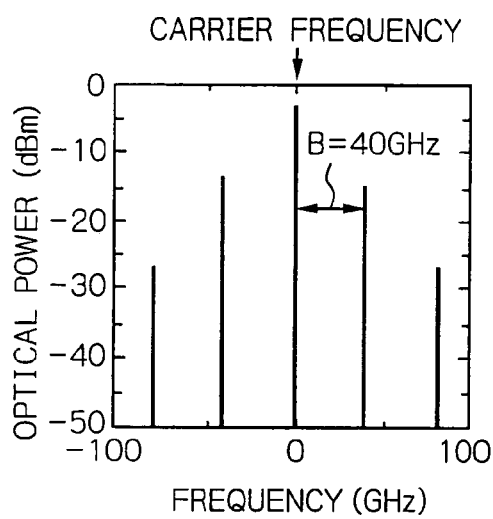

In FIG. 1, which illustrates a first prior art optical transmitter, the optical transmitter uses a conventional format. That is, reference numeral 101 designates a continuous wave (CW) optical source such as a laser diode (LD) for generating an optical signal S11 having a carrier frequency component which is transmitted to a clock modulator 102 formed by a single-end type intensity modulator 1021 for performing a clock modulation upon the optical signal S11 using a clock signal CLK having a frequency of B where B is a bit rate of an NRZ data signal D. As a result, the intensity modulator 1021 generates a clock-modulated signal S12 which has an output waveform, i.e., an eye pattern as shown in FIG. 2A and an optical spectrum as shown in FIG. 2B.

Figure 3A:
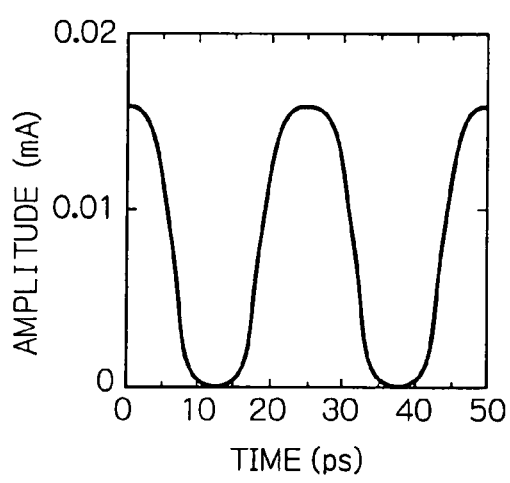
FIGS. 3A and 3B are an eye pattern and an optical spectrum, respectively, of the data-modulated signal of FIG. 1.
Figure 3B:
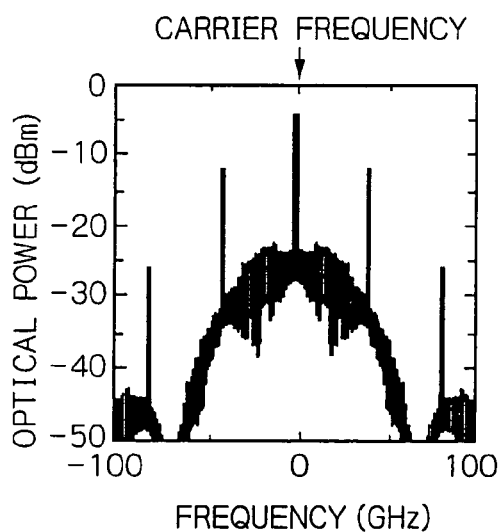

The clock-modulated signal S12 is transmitted via an optical amplifier 103 to a data modulator 104 formed by a push-pull type intensity modulator 1041 for performing a data modulation upon the clock-modulated signal S12 using the NRZ data signal D and its inverted data signal D having a bit rate of B. As a result, the intensity modulator 1041 generates an intensity-modulated signal S13 which has an output waveform, i.e., an eye pattern as shown in FIG. 3A and an optical spectrum as shown in FIG. 3B. In this case, a phase shifter 1042 is provided so that the NRZ data signal D and its inverted data signal D have a phase difference of 180°.

The data-modulated signal S13 is transmitted via an optical amplifier 105 to an optical fiber.

In the optical transmitter of FIG. 1, however, since the spectrum bandwidth of a main lobe is relatively large, the optical spectrum of neighboring channels may be superposed onto each other in WDM systems, so that the neighboring channels easily interfere with each other. Also, to reduce the waveform distortion caused by a synergistic effect between wavelength dispersion of the optical fiber and nonlinear effects such as self-phase modulation (SPM) and cross-phase modulation (XPM), the transmitted power is preferably relatively small, which decreases the transmission distance.

Figure 4:
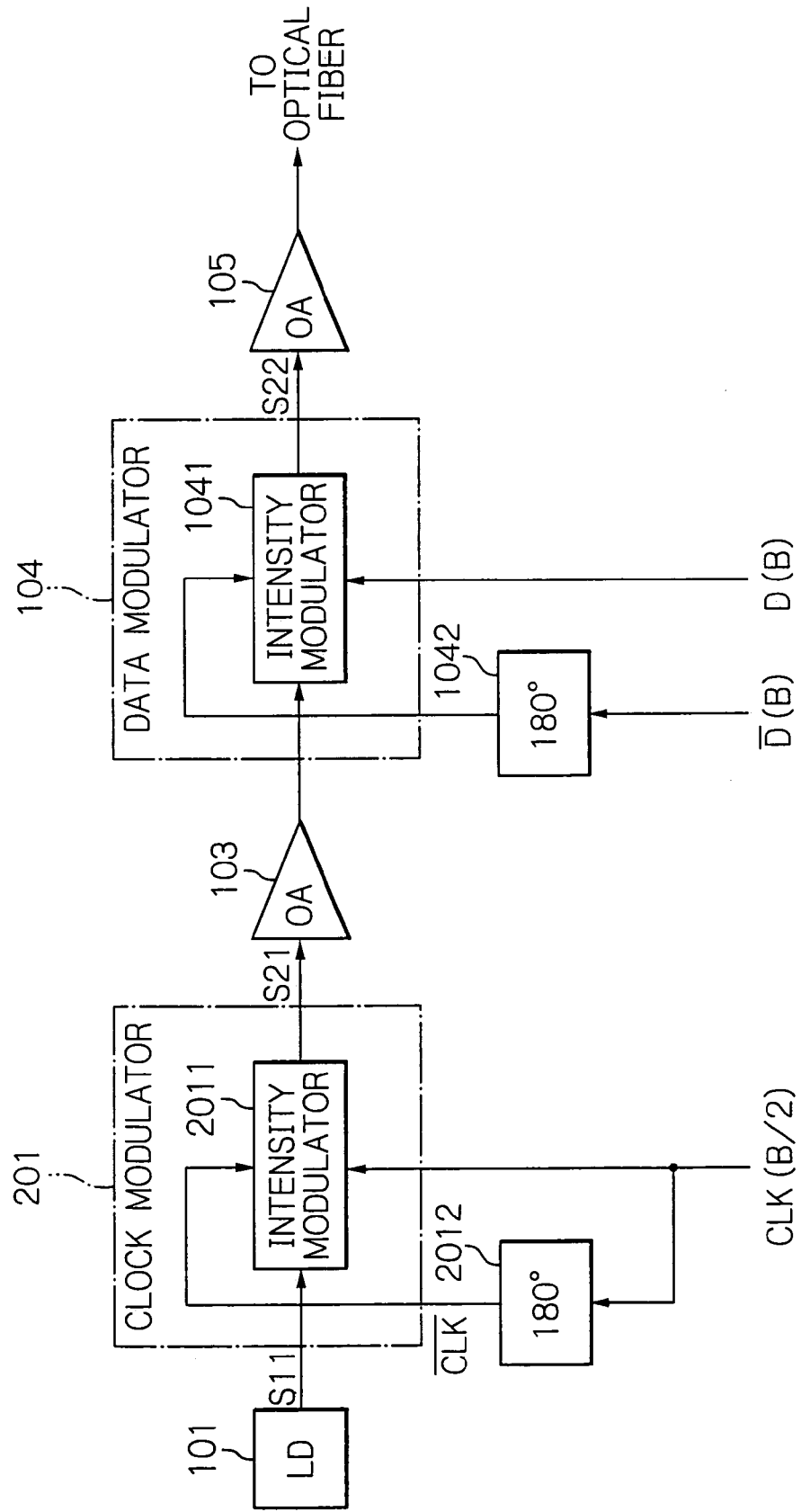
FIG. 4 is a block diagram illustrating a second prior art optical transmitter.
Figure 5A:
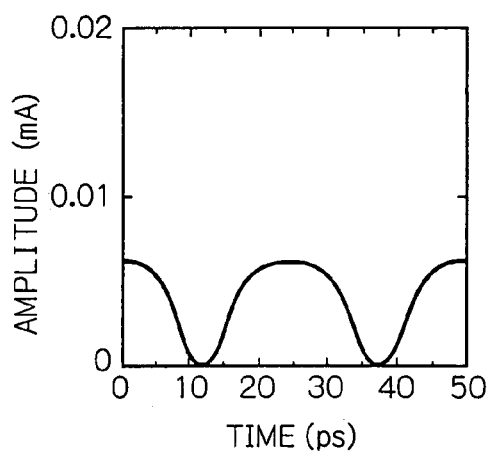
FIGS. 5A and 5B are an eye pattern and an optical spectrum, respectively, of the clock-modulated signal of FIG. 4.
Figure 5B:
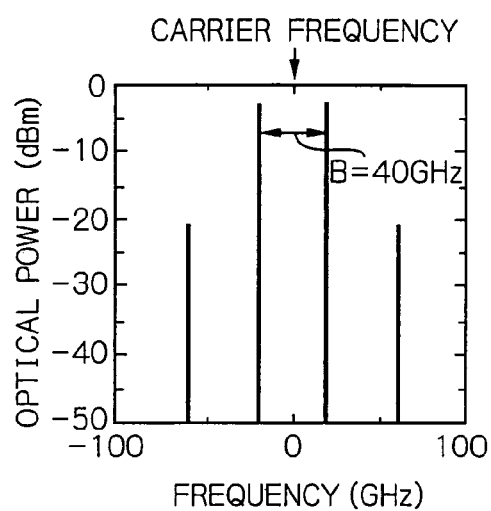

In FIG. 4, which illustrates a second prior art optical transmitter, the optical transmitter uses a carrier-suppressed return-to-zero (CS-RZ) format (see: Y. Miyamoto et al., "320 Gbit/s (8×40 Gbit/s) WDM transmission over 367 km with 120 km repeater spacing using carrier-suppressed return-to-zero format", Electronics Letters, Vol. 35, No.23, pp. 2041-2042, Nov. 11, 1999). In FIG. 4, the clock modulator 102 of FIG. 1 is replaced by a clock modulator 201 where the single-end type intensity modulator 1021 of FIG. 1 is replaced by a push-pull type modulator 2011 for performing a clock modulation upon the optical signal S11 using clock signals CLK and CLK having a frequency of B/2. Note that the clock signal CLK is generated via a 180° phase shifter 2012 using the clock signal CLK. As a result, the intensity modulator 2011 generates a clock-modulated signal S21 which has an output waveform, i.e., an eye pattern as shown in FIG. 5A and an optical spectrum as shown in FIG. 5B.

Figure 6A:
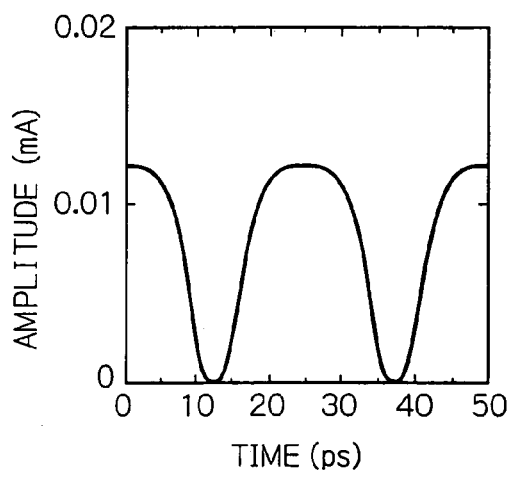
FIGS. 6A and 6B are an eye pattern and an optical spectrum, respectively, of the data-modulated signal of FIG. 4.
Figure 6B:
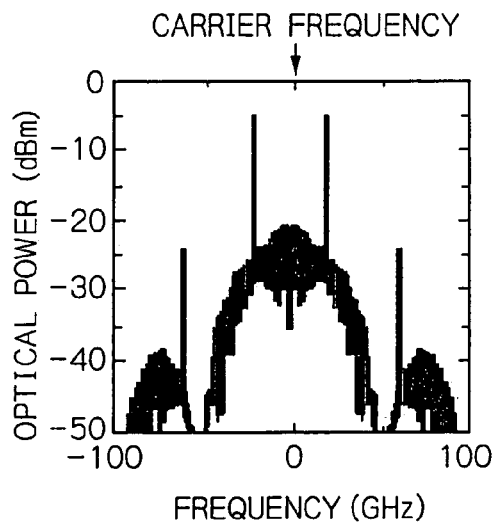

The clock-modulated signal S21 is transmitted via the optical amplifier 103 to the push-pull type data modulator 104 formed by the intensity modulator 1041 for performing a data modulation upon the clock-modulated signal S21 using the NRZ data signal D and its inverted data signal D having a bit rate of B. As a result, the intensity modulator 1041 generates an intensity-modulated signal S22 which has an output waveform, i.e., an eye pattern as shown in FIG. 6A and an optical spectrum as shown in FIG. 6B.

The data-modulated signal S22 is transmitted via the optical amplifier 105 to the optical fiber.

In the optical transmitter of FIG. 4, the carrier frequency component is suppressed. Also, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is suppressed, the transmitted power from the transmitter can be relatively large, which upgrades the transmission speed characteristics and increases the transmission distance.

In the optical transmitter of FIG. 4, however, the adjustment of phase and amplitude between the clock signals CLK and CLK and the adjustment of a bias voltage are very troublesome. In more detail, the push-pull type clock modulator 2011 is provided in order to carry out a chirpless clock modulation. The push-pull type clock modulator 2011 requires a pair of the clock signals CLK and CLK where a phase difference between is required to be accurately 180° and the amplitudes thereof need to be accurately the same as each other. Also, a bias voltage needs to be accurately set to the minimum point of the extinction characteristic of the push-pull type clock modulator 2011.

Figure 7:
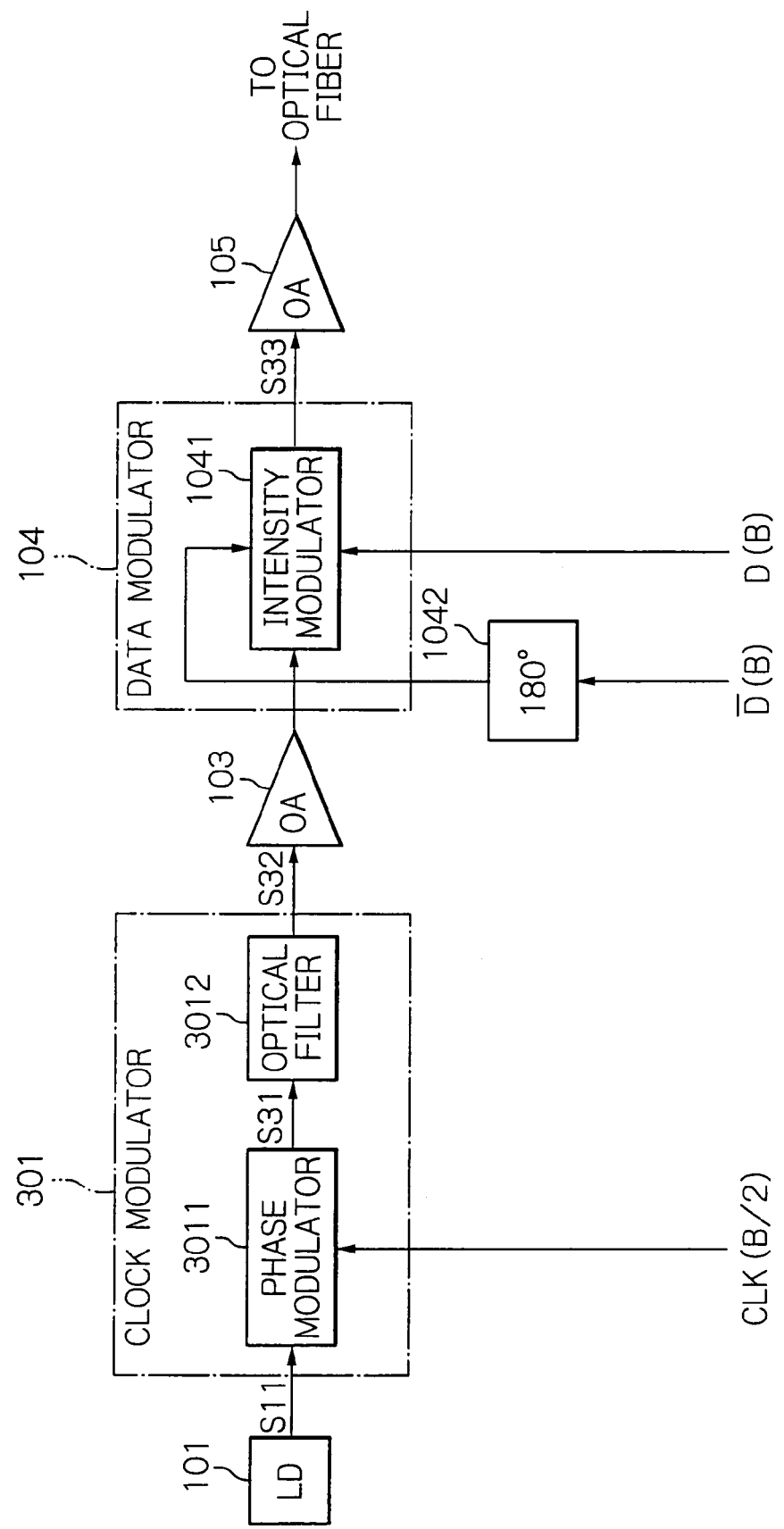
FIG. 7 is a diagram illustrating a third prior art optical transmitter.

In FIG. 7, which illustrates a third prior art optical transmitter, the optical transmitter uses an AC-RZ format (see: R. Ohhira et al., "Novel RZ signal format with alternate-chirp for suppression of nonlinear degradation in 40 Gb/s based WDM", OFC2001, WH2-1, WH2-3, March 2001).

In FIG. 7, the clock modulator 102 of FIG. 1 is replaced by a clock modulator 301 formed by a single-end type phase modulator 3011 and an optical filter 3022.

The phase modulator 3011 performs a clock modulation upon the optical signal S11 using a clock signal CLK having a frequency of B/2. Note that, a voltage for transition of a phase of π of the optical signal S11 is denoted by $V_\pi$ and the amplitude of the clock signal CLK is denoted by $V_{CLK}$, a phase modulation index can be denoted by $$\pi \cdot V_{CLK}/V_\pi$$

Figure 8A:
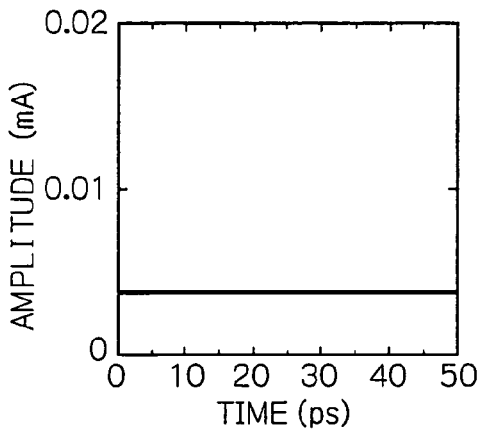
FIGS. 8A and 8B are an eye pattern and an optical spectrum, respectively, of the first clock-modulated signal of FIG. 7.
Figure 8B:
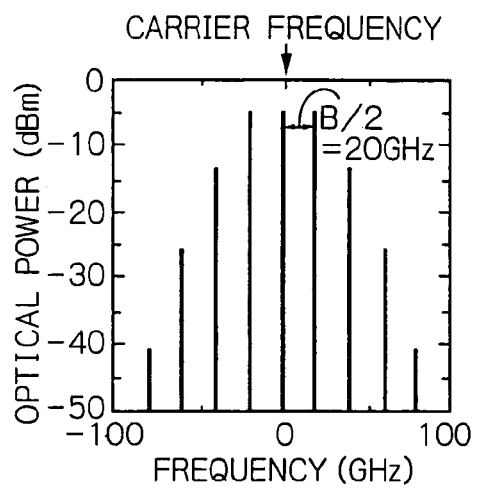

In this case, since the power of first double-sideband components is preferable to be large, the phase modulation index is set to be 0.5 π. As a result, the phase modulator 3011 generates a clock-modulated signal S31 which has an output waveform, i.e., an eye pattern as shown in FIG. 8A and an optical spectrum as shown in FIG. 8B.

Figure 9A:
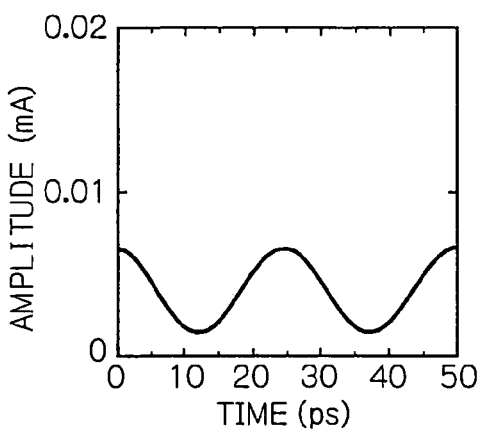
FIGS. 9A and 9B are an eye pattern and an optical spectrum, respectively, of the second clock-modulated signal of FIG. 7.
Figure 9B:
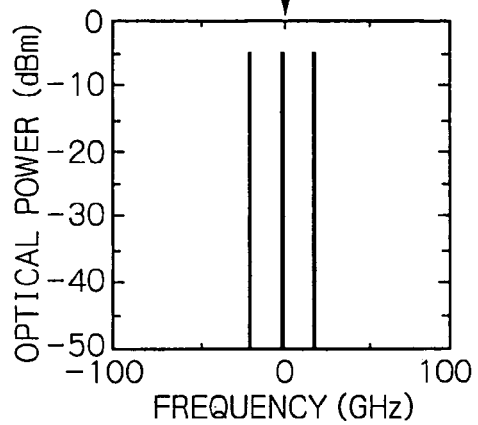

The pass-band of the clock-modulated signal S31 is limited by the optical filter 3012 to generate a clock-modulated signal S32 which has an output waveform, i.e., an eye pattern as shown in FIG. 9A and an optical spectrum as shown in FIG. 9B. That is, only the carrier frequency component and the first double-sideband components pass through the optical filter 3012.

Figure 10A:
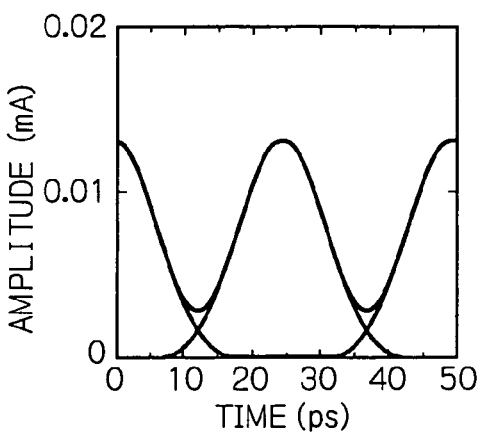
FIGS. 10A and 10B are an eye pattern and an optical spectrum, respectively, of the data-modulated signal of FIG. 7.
Figure 10B:
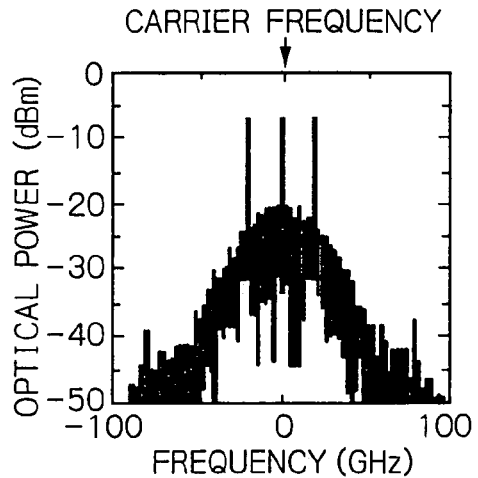

The clock-modulated signal S32 is transmitted via the optical amplifier 103 to the data modulator 104 formed by the push-pull type intensity modulator 1041 for performing a data modulation upon the clock-modulated signal S32 using the NRZ data signal D and its inverted data signal D having a bit rate of B. As a result, the intensity modulator 1041 generates an intensity-modulated signal S33 which has an output waveform, i.e., an eye pattern as shown in FIG. 10A and an optical spectrum as shown in FIG. 10B.

The data-modulated signal S33 is transmitted via the optical amplifier 105 to the optical fiber.

Even in the optical transmitter of FIG. 7, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is further suppressed, the launched power from the transmitter can be set to be relatively large compared with the optical transmitter of FIG. 4, which would further upgrade the transmission speed characteristics and further increase the transmission distance. Further, the adjustment of phase and amplitude of the clock signal and the adjustment of a bias voltage are very easy.

In the optical transmitter of FIG. 7, however, the clock modulator 301 and the data modulator 104 cannot be integrated into one substrate made of $LiNbO_3$ or $LiTaO_3$, because the optical filter 3012 cannot be formed on such a substrate.

Figure 11:
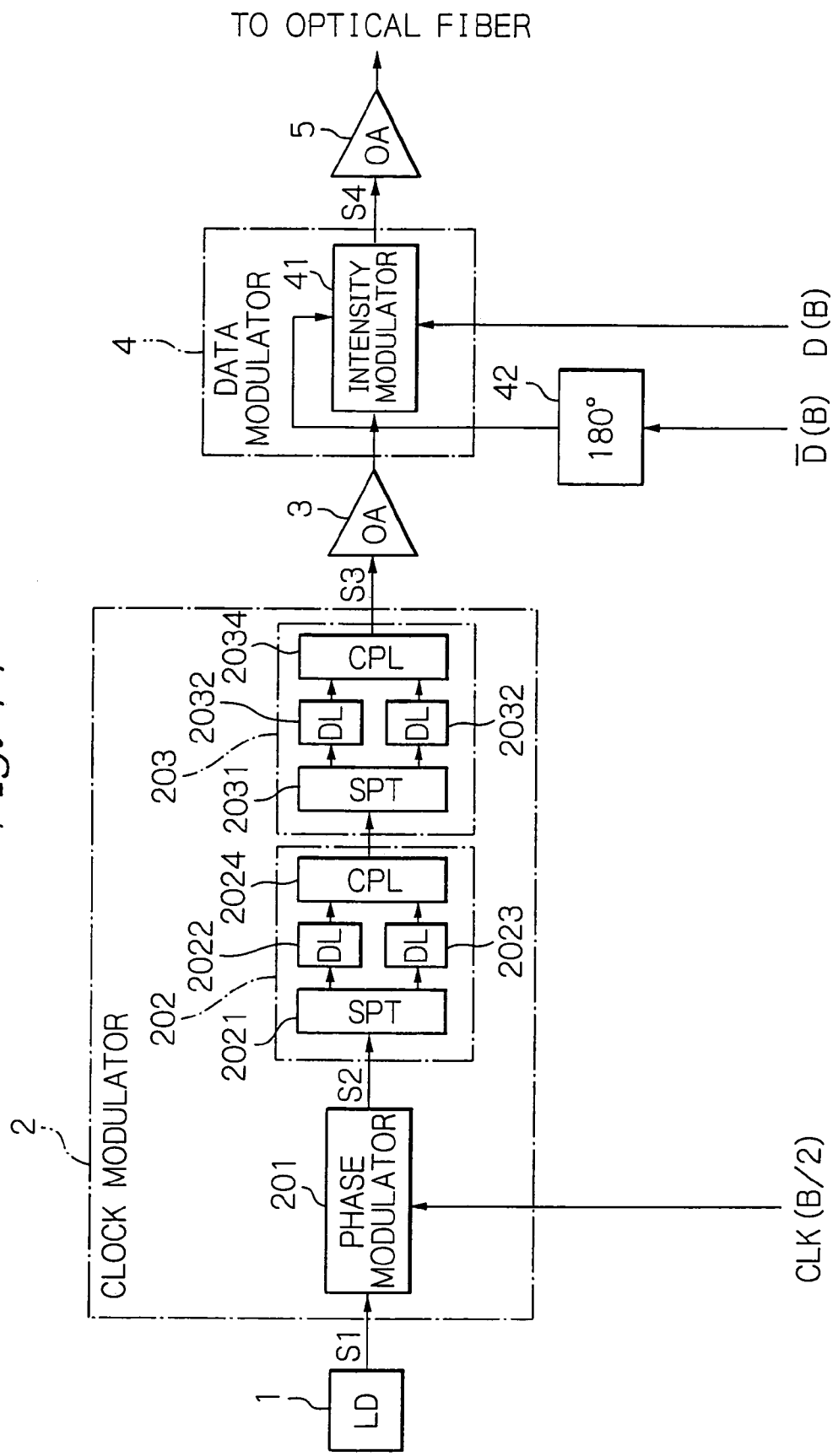
FIG. 11 is a block diagram illustrating a first embodiment of the optical transmitter according to the present invention.

In FIG. 11, which illustrates a first embodiment of the optical transmitter according to the present invention, a reference numeral 1 designates continuous wave (CW) optical source such as a laser diode (LD) for generating an optical signal S1 having a carrier frequency component which is transmitted to a clock modulator 2.

The clock modulator 2 is formed by a single-end type phase modulator 201 and two tap type optical filters 202 and 203.

In the same way as in the phase modulator 3011 of FIG. 7, the phase modulator 201 performs a clock modulation upon the optical signal S1 using a clock signal CLK having a frequency of B/2. Note that, a voltage for transition of a phase of π of the optical signal S1 is denoted by $V_\pi$ and the amplitude of the clock signal CLK is denoted by $V_{CLK}$, a phase modulation index can be denoted by $$\pi \cdot V_{CLK}/V_\pi$$

Figure 12A:
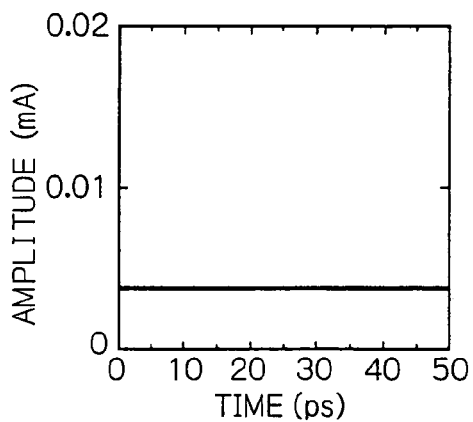
FIGS. 12A and 12B are an eye pattern and an optical spectrum, respectively, of the output signal at the phase modulator of FIG. 11.
Figure 12B:
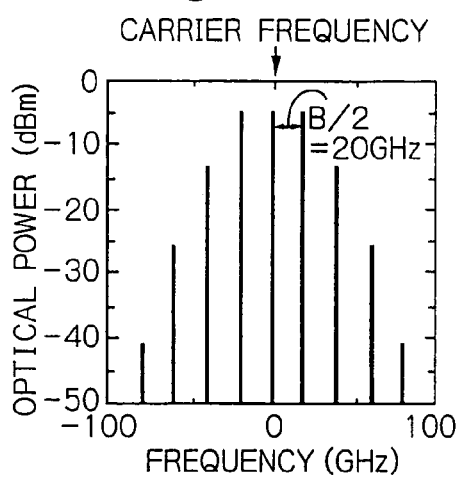

In this case, since the power of first double-sideband components is preferable to be large, the phase modulation index is set to be 0.5 π. As a result, the phase modulator 201 generates a clock-modulated signal S2 which has an output waveform, i.e., an eye pattern as shown in FIG. 12A and an optical spectrum as shown in FIG. 12B.

Figure 13A:
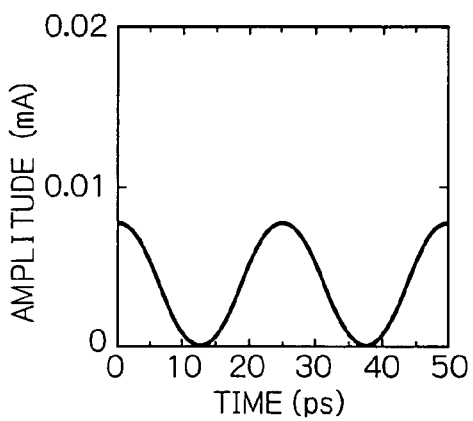
FIGS. 13A and 13B are an eye pattern and an optical spectrum, respectively, of the output signal at the second tap type filter of FIG. 11.
Figure 13B:
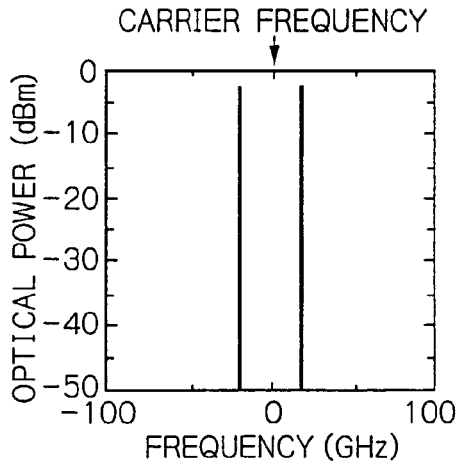

The pass-band of the clock-modulated signal S2 is limited by the tap type optical filters 202 and 203 to generate a clock-modulated signal S3 which has an output waveform, i.e. an eye pattern as shown in FIG. 13A and an optical spectrum as shown in FIG. 13B. That is, first double-sideband components pass through the optical filters 202 and 203, but the carrier frequency component, second double-sideband components, third double-sideband components and fourth double-sideband components are suppressed, which will be later explained.

Figure 14A:
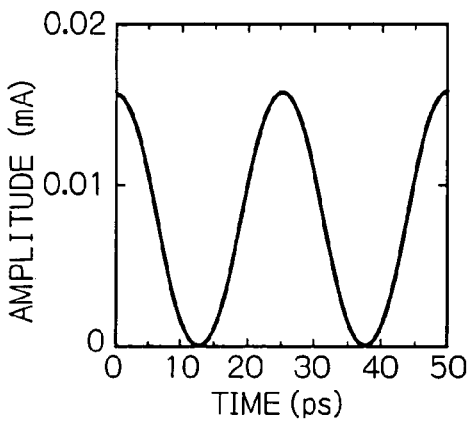
FIGS. 14A and 14B are an eye pattern and an optical spectrum, respectively, of the output signal at the data modulator of FIG. 11.
Figure 14B:
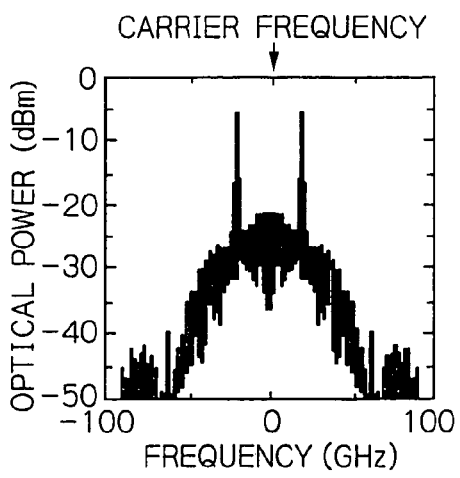

The clock-modulated signal S3 is transmitted via an optical amplifier 3 to a data modulator 4 formed by a push-pull type intensity modulator 41 for performing a data modulation upon the clock-modulated signal S3 using an NRZ data signal D and its inverted data signal D having a bit rate of B. As a result, the intensity modulator 41 generates an intensity-modified signal S4 which has an output waveform, i.e., an eye pattern as shown in FIG. 14A and an optical spectrum as shown in FIG. 14B. In this case, a phase shifter 42 is provided so that the NRZ data signal D and its inverted data signal D have a phase difference of 180°.

The data-modulated signal S4 is transmitted via an optical amplifier 5 to the optical fiber.

The tap type optical filter 202 is constructed by an optical splitter 2021 for splitting an input optical signal into two optical signals, two optical delay lines 2022 and 2023 for receiving the two optical signals, respectively, and an optical coupler 2024 for coupling the optical signals from the optical delay lines 2022 and 2023 to generate an optical signal. Note that the optical delay lines 2022 and 2023 are used for adjusting the phase difference between the two optical signals from the optical splitter 2021. Therefore, one of the optical delay lines 2022 and 2023 can be omitted.

Figure 15:
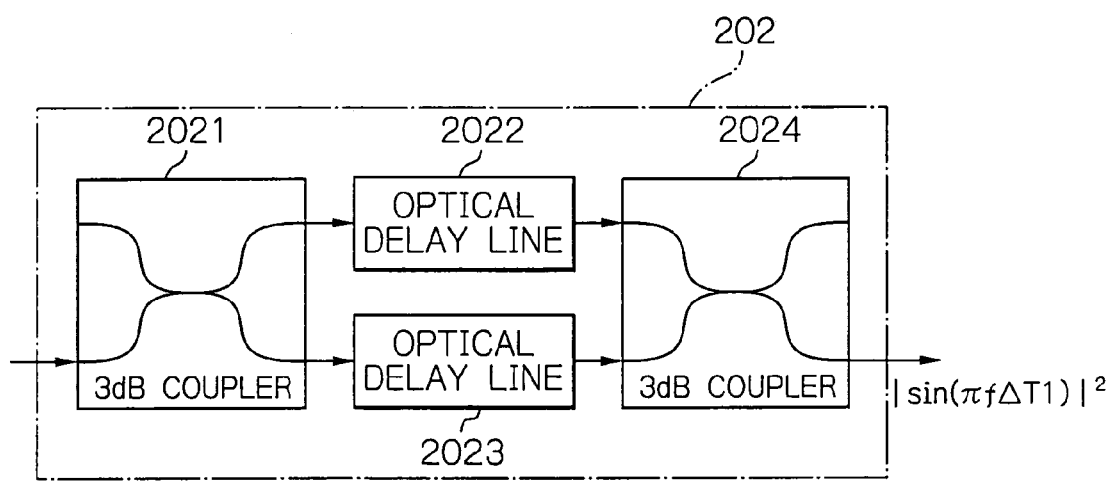
FIG. 15 is a block diagram of the first tap type optical filter of FIG. 11.

In FIG. 15, which is a detailed configuration of the tap type optical filter 202 of FIG. 11, the optical splitter 2021 is formed by a 3 dB optical directional coupler, and the optical coupler 2024 is formed by a 3 dB optical directional coupler. In this case, a transmission function K(f) is represented by $$|K(f)|^2 = |\sin(\pi f \Delta T1)|^2 \quad (1)$$

where f is a relative frequency component with reference to the carrier frequency component; and ΔT1 is a difference in delay time between the optical delay lines 2022 and 2023. As is apparent from equation (1), the carrier frequency component is suppressed regardless of the difference ΔT1. Also, in order to suppress second double-sideband components, fourth double-sideband components, sixth double-sideband components, . . . , 2n-th double-sideband components, . . . , i.e., in order to suppress frequency components ±2n·B/2 where n is 1, 2, 3, . . . , $$\pi \cdot B \cdot \Delta T1 = \pi$$

$$\therefore \Delta T1 = 1/B$$

On the other hand, the tap type optical filter 203 is constructed by an optical splitter 2031 for splitting an input optical signal into two optical signal, two optical delay lines 2032 and 2033 for receiving the two optical signals, respectively, and an optical coupler 2034 for coupling the optical signals from the optical delay lines 2032 and 2033 to generate an optical signal. Note that the optical delay lines 2032 and 2033 are used for adjusting the difference in phase between the two optical signals from the optical splitter 2031. Therefore, one of the optical delay lines 2032 and 2033 can be omitted.

Figure 16A:
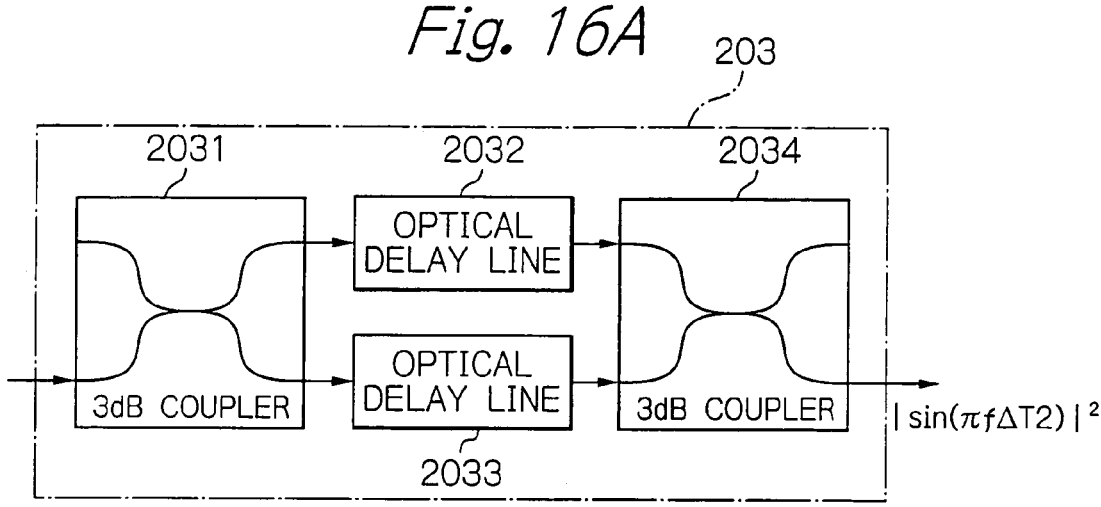
FIGS. 16A, 16B and 16C are block diagrams of the second tap type optical filter of FIG. 11.

In FIG. 16A, which is a detailed configuration of a first example of the tap type optical filter 203 of FIG. 11, the optical splitter 2031 is formed by a 3 dB optical directional coupler, and the optical coupler 2034 is formed by a 3 dB optical directional coupler. In this case, a transmission function Q(f) is represented by $$|Q(f)|^2 = |\sin(\pi f \Delta T2)|^2 \quad (2)$$

where f is a relative frequency component with reference to the carrier frequency component; and ΔT2 is a difference in delay time between the optical delay lines 2032 and 2033. In order to suppress third double-sideband components, sixth double-sideband components, ninth double-sideband components, . . . , 3n-th double-sideband components, . . . , i.e., in order to suppress frequency components ±3n·B/2 where n is 1, 2, 3, . . . , $$\pi \cdot 3B/2 \cdot \Delta T2 = \pi$$

$$\therefore \Delta T2 = 2/(3B)$$

Figure 16B:
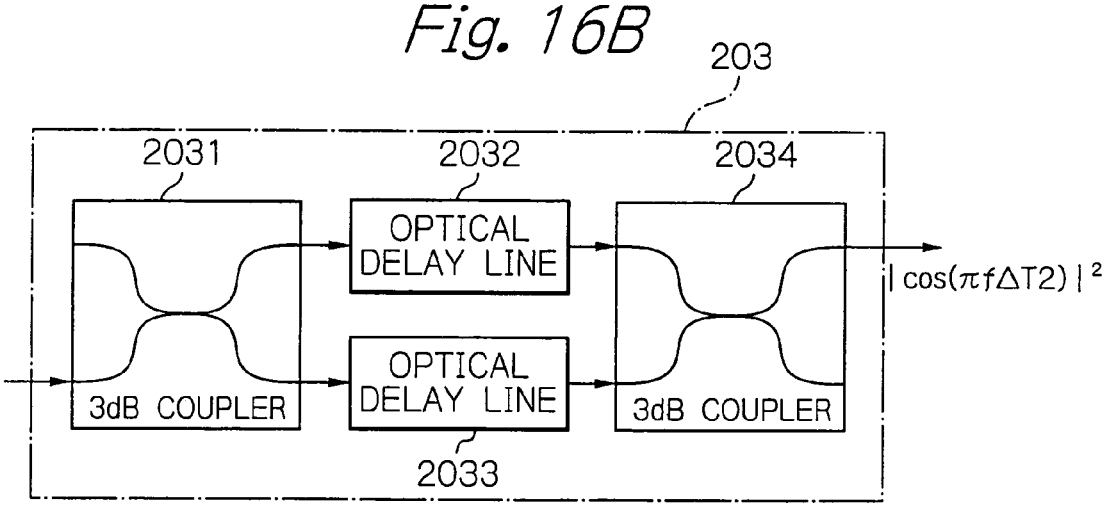

In FIG. 16B, which is a detailed configuration of a second example of the tap type optical filter 203 of FIG. 11, the optical splitter 2031 is also formed by a 3 dB optical directional coupler, and the optical coupler 2034 is also formed by a 3 dB optical directional coupler. In this case, a transmission function Q(f) is represented by $$|Q(f)|^2 = |\cos(\pi f \Delta T2)|^2 \quad (3)$$

In order to suppress third double-sideband components, ninth double-sideband components, fifteen double-sideband components, . . . , (6n−3)-th double-sideband components, . . . , i.e., in order to suppress frequency components ±(6n−3)·B/2 where n is 1, 2, 3, . . . , $$\pi \cdot (3/2) B \Delta T2 = \pi/2$$

$$\therefore \Delta T2 = 1/(3B)$$

Figure 16C:
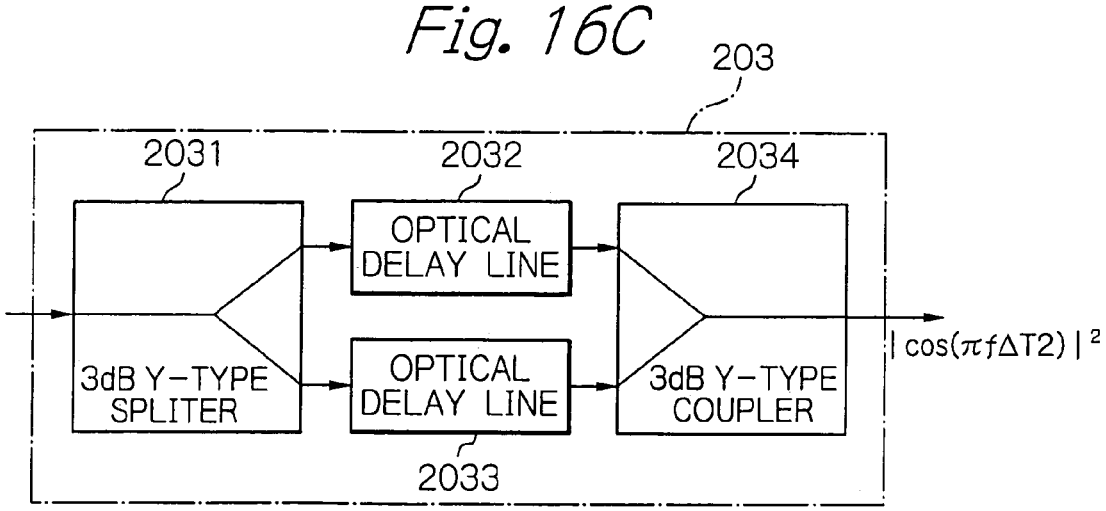

In FIG. 16C, which is a detailed configuration of a third example of the tap type optical filter 203 of FIG. 11, the optical splitter 2031 is formed by a Y-type optical splitter, and the optical coupler 2034 is formed by a Y-type optical coupler. In this case, a transmission function Q(f) is represented by the above-mentioned equation (3).

Therefore, in this case, $$\Delta T2 = 1/(3B)$$

Even in the optical transmitter of FIG. 11, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is further suppressed, the launched power from the transmitter can be set to be relatively large compared with the optical transmitter of FIG. 4, which would further upgrade the transmission speed characteristics and further increase the transmission distance. Further, the adjustment of phase and amplitude of the clock signal and the adjustment of a bias voltage are very easy.

Figure 17A:
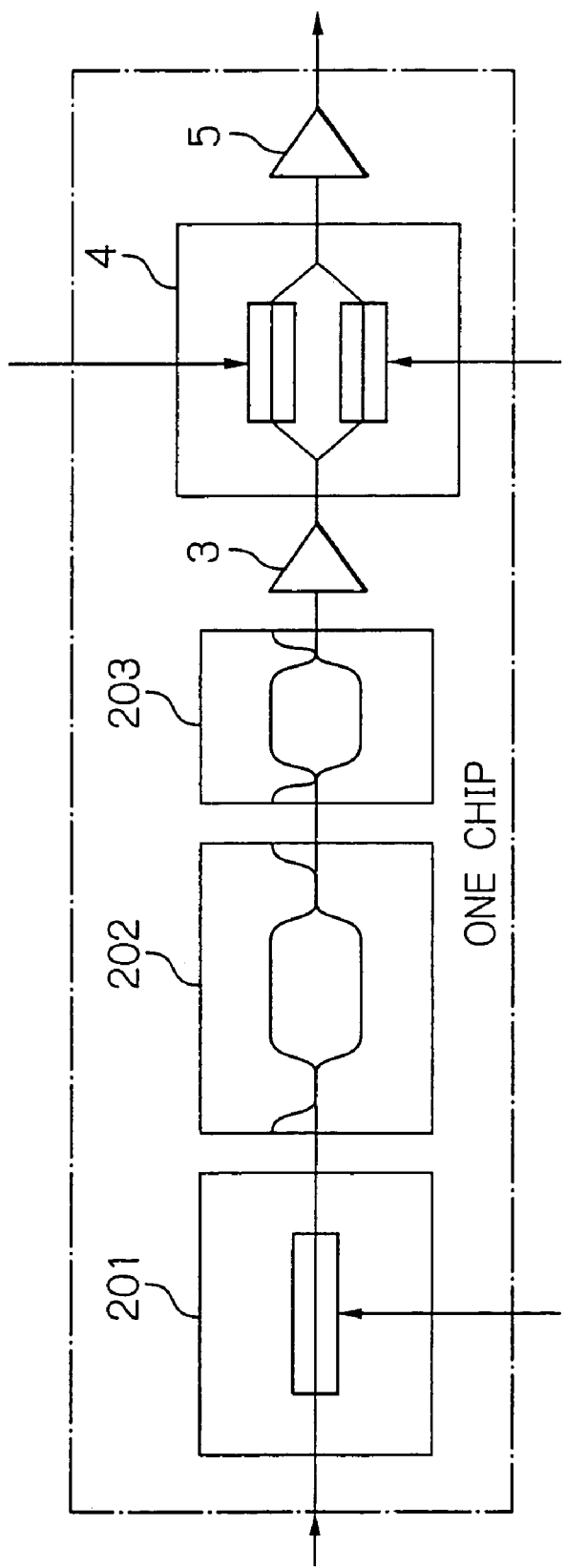
FIG. 17A is a block diagram illustrating one chip forming the clock modulator and data modulator of FIG. 11.

In the optical transmitter of FIG. 11, since the tap type filters 202 and 203 can be formed on a substrate made of LiNbO$_3$ or LiTaO$_3$, the clock modulator 2 and the data modulator 4 can be integrated into one substrate made of LiNbO$_3$ or LiTaO$_3$, as illustrated in FIG. 17A.

In the optical transmitter of FIG. 11, the tap type filter 203 can be provided at a prestage of the tap type filter 202. Also, as illustrated in FIG. 17B, one of the tap type filters 202 and 203 can be provided at a post stage of the data modulator 4. Further, as illustrated in FIG. 17C, the tap type filter 203 can be omitted.

Additionally, although the intensity modulator 41 is constructed by a push-pull type Mach-Zehnder modulator, the intensity modulator 41 can be constructed by a single-end type Mach-Zehnder modulator or an electro-absorption modulator.

Figure 18:
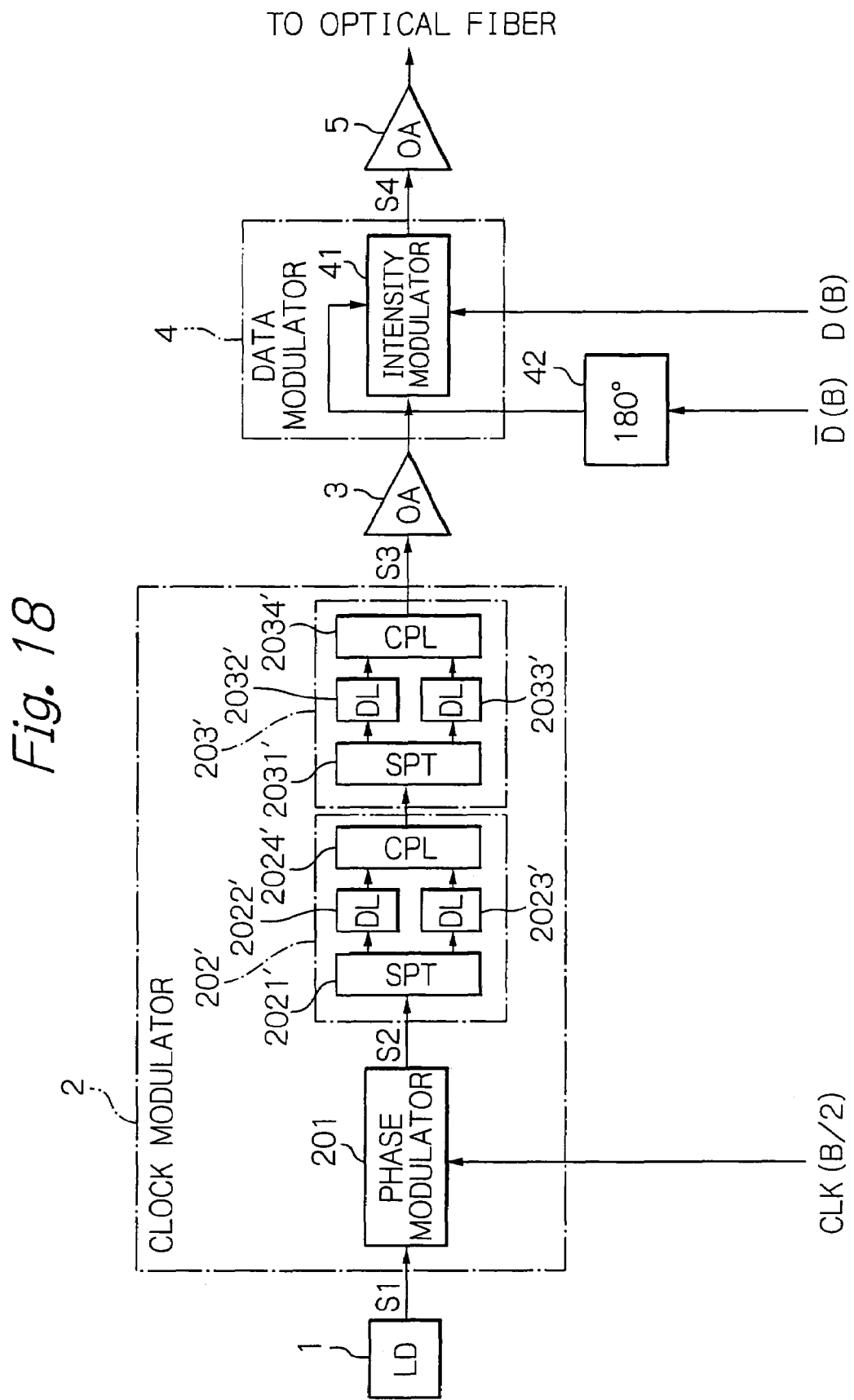
FIG. 18 is a block diagram illustrating a second embodiment of the optical transmitter according to the present invention.

In FIG. 18, which illustrates a second embodiment of the optical transmitter according to the present invention, tap type optical filters 202' and 203' are provided instead of the tap type optical filters 202 and 203, respectively, of FIG. 11. The continuous wave (CW) optical source such as a laser diode (LD) generates a optical signal S1 having a carrier frequency component which is transmitted to a clock modulator 2.

In the same way as in the phase modulator 3011 of FIG. 7, the phase modulator 201 performs a clock modulation upon the optical signal S1 using a clock signal CLK having a frequency of B/2. Note that, if a voltage for transition of a phase of π of the optical signal S1 is denoted by $V_\pi$ and the amplitude of the clock signal CLK is denoted by $V_{CLK}$, a phase modulation index can be denoted by $$\pi \cdot V_{CLK}/V_\pi$$

Figure 19A:
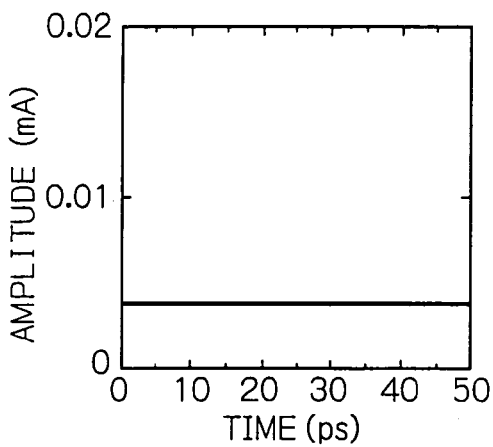
FIGS. 19A and 19B are an eye pattern and an optical spectrum, respectively, of the output signal at the phase modulator of FIG. 18.
Figure 19B:
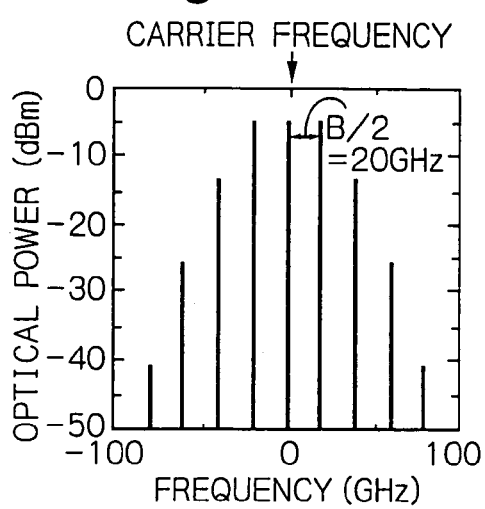

In this case, since the power of first double-sideband components is preferable to be large, the phase modulation index is set to be $0.5\pi$. Particularly, the level of the carrier frequency component is brought close to that of the first double-sideband components, to reduce the non-linear effects. As a result, the phase modulator 201 generates a clock-modulated signal S2 which has an output waveform, i.e., an eye pattern as shown in FIG. 19A and an optical spectrum as shown in FIG. 19B.

Figure 20A:
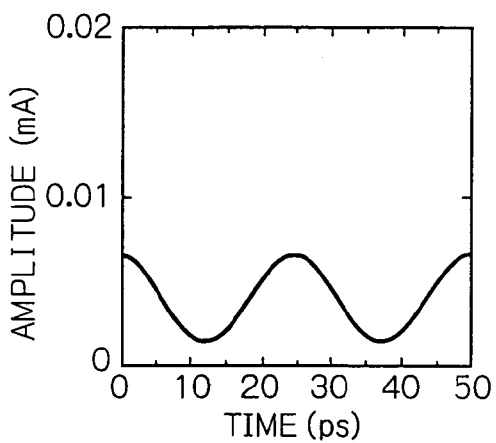
FIGS. 20A and 20B are an eye pattern and an optical spectrum, respectively, of the output signal at the second tap type filter of FIG. 19.
Figure 20B:
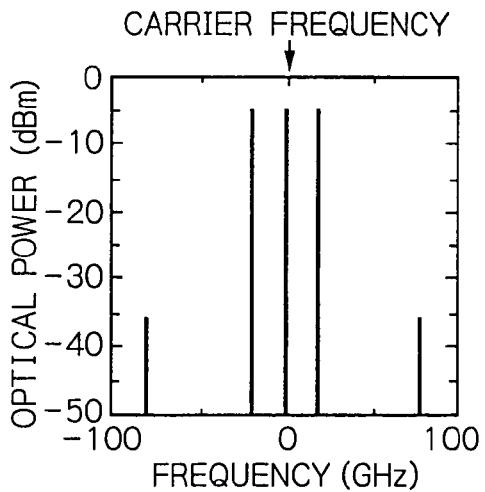

The pass-band of the clock-modulated signal S2 is limited by the tap type optical filters 202' and 203' to generate a clock-modulated signal S3 which has an output waveform, i.e., an eye pattern as shown in FIG. 20A and an optical spectrum as shown in FIG. 20B. That is, the carrier frequency component, first double-sideband components and fourth double-sideband components pass through the optical filters 202' and 203', but second double-sideband components and third double-sideband components are suppressed, which will be later explained.

Figure 21A:
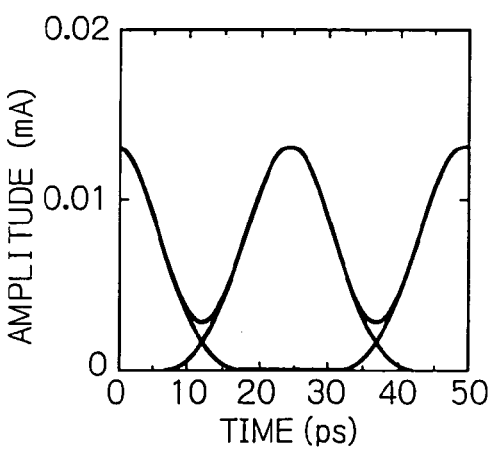
FIGS. 21A and 21B are an eye pattern and an optical spectrum, respectively, of the output signal at the data modulator of FIG. 18.
Figure 21B:
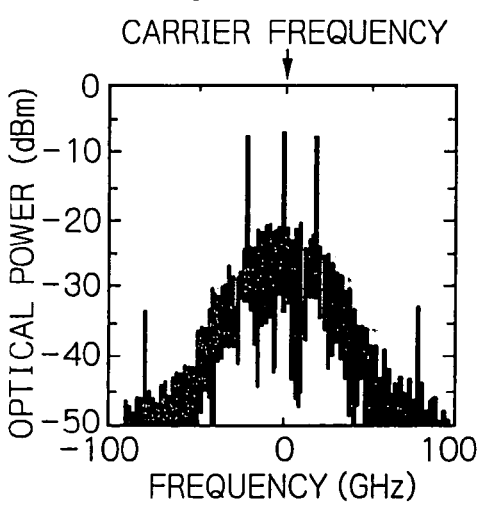

The clock-modulated signal S3 is transmitted via the optical amplifier 3 to the data modulator 4 formed by the push-pull type intensity modulator 41 for performing a data modulation upon the clock-modulated signal S3 using the NRZ data signal D and its inverted data signal D having a bit rate of B. As a result, the intensity modulator 41 generates an intensity-modulated signal S4 which has an output waveform, i.e., an eye pattern as shown in FIG. 21A and an optical spectrum as shown in FIG. 21B. In this case, the phase shifter 42 is provided so that the NRZ data signal D and its inverted data signal D have a phase difference of 180°.

The data-modulated signal S4 is transmitted via the optical amplifier 5 to the optical fiber.

The tap type optical filter 202' is constructed by an optical splitter 2021' for splitting an input optical signal into two optical signals, two optical delay lines 2022' and 2023' for receiving the two optical signals, respectively, and an optical coupler 2024' for coupling the optical signals from the optical delay lines 2022' and 2023' to generate an optical signal. Note that the optical delay lines 2022' and 2023' are used for adjusting the phase difference between the two optical signals from the optical splitter 2021'. Therefore, one of the optical delay lines 2022' and 2023' can be omitted.

Figure 22A:
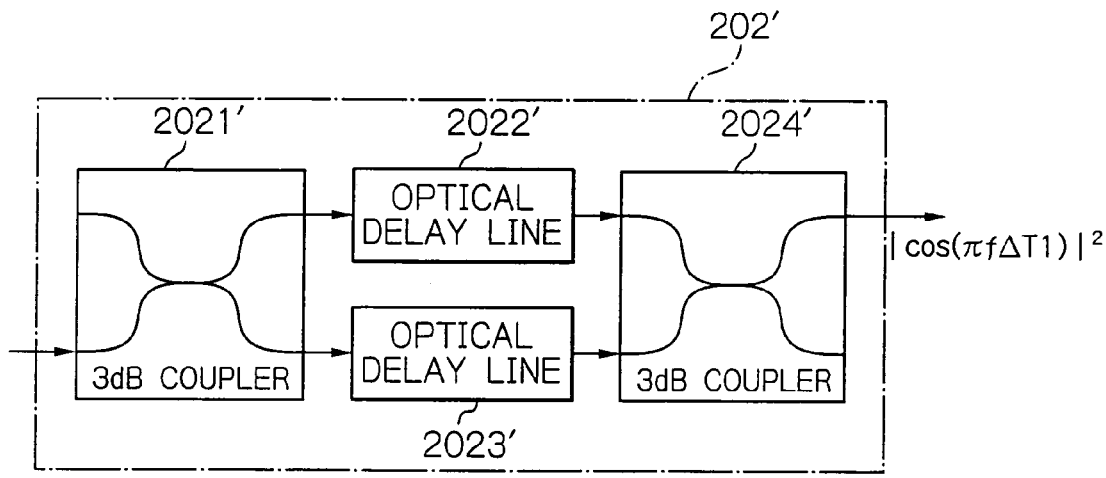
FIGS. 22A and 22B are block diagrams of the first tap type optical filter of FIG. 18.

In FIG. 22, which is a detailed configuration of a first example of the tap type optical filter 202' of FIG. 18, the optical splitter 2021' is formed by a 3 dB optical directional coupler, and the optical coupler 2024' is formed by a 3 dB optical directional coupler. In this case, a transmission function K(f) is represented by $$|K(f)|^2 = |\cos(\pi f \Delta T1)|^2 \quad (4)$$

where f is a relative frequency component with reference to the carrier frequency component; and $\Delta T1$ is a difference in delay time between the optical delay lines 2022' and 2023'. In this case, in order to suppress second double-sideband components, sixth double-sideband components, tenth double-sideband components, . . . , (4n−2)-th double-sideband components, . . . i.e., in order to suppress frequency components $\pm(4n-2)\cdot B/2$ where n is 1, 2, 3, . . . , $$\pi \cdot B \cdot \Delta T1 = \pi/2$$

$$\therefore \Delta T1 = 1/(2B)$$

Figure 22B:
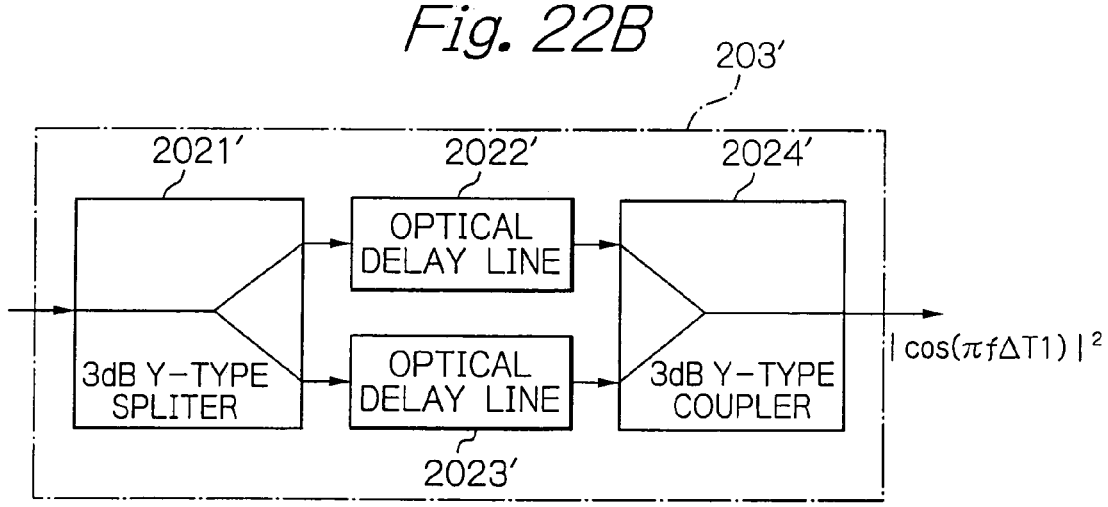

In FIG. 22B, which is a detailed configuration of a second example of the tap type optical filter 202' of FIG. 18, the optical splitter 2021' is formed by a 3 dB Y-type optical splitter, and the optical coupler 2024' is formed by a 3 dB Y-type optical coupler. In this case, a transmission function K(f) is represented by the above-mentioned equation (4). Therefore, in this case, $$\Delta T1 = 1/(2B)$$

On the other hand, the tap type optical filter 203' is constructed by an optical splitter 2031' for splitting an input optical signal into two optical signal, two optical delay lines 2032' and 2033' for receiving the two optical signals, respectively, and an optical coupler 2034' for coupling optical signals from the optical delay lines 2032' and 2033' to generate an optical signal. Note that the optical delay lines 2032' and 2033' are used for adjusting the phase difference between the two optical signals from the optical splitter 2031'. Therefore, one of the optical delay lines 2032' and 2033' can be omitted.

Figure 23A:
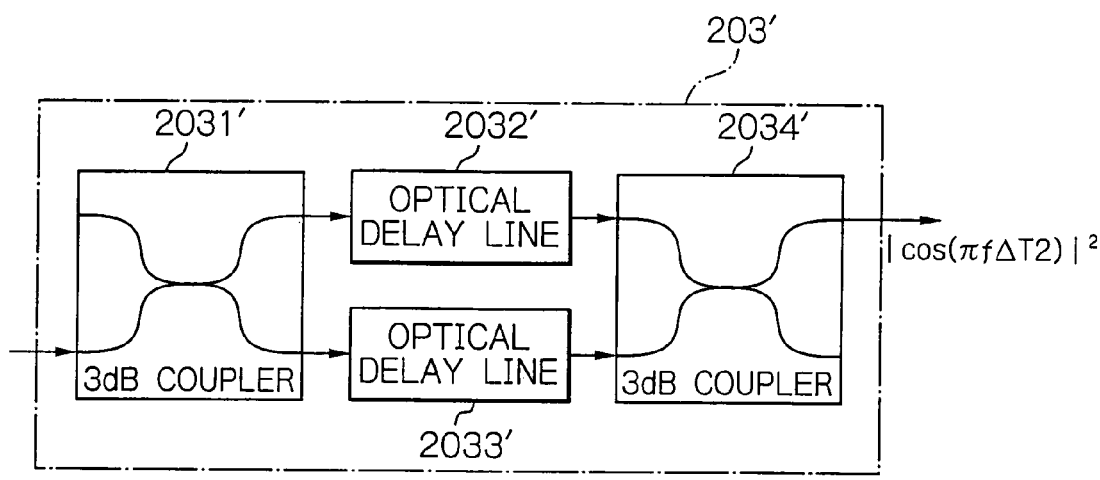
FIG. 23A and 23B are block diagrams of the second tap type optical filter of FIG. 18.

In FIG. 23A, which is a detailed configuration of a first example of the tap type optical filter 203' of FIG. 18, the optical splitter 2031' is formed by a 3 dB optical directional coupler, and the optical coupler 2034' is formed by a 3 dB optical directional coupler. In this case, a transmission function Q(f) is represented by $$|Q(f)|^2 = |\cos(\pi f \Delta T2)|^2 \quad (5)$$

where f is a relative frequency component with reference to the carrier frequency component; and $\Delta T2$ is a difference in delay time between the optical delay lines 2032' and 2033'. In order to suppress third double-sideband components, ninth double-sideband components, . . . , (6n−3)-th double-sideband components, . . . , i.e., in order to suppress frequency components $\pm(6n-3)\cdot B/2$ where n is 1, 2, 3, . . . , $$\pi \cdot 3B/2 \cdot \Delta T2 = \pi/2$$

$$\therefore \Delta T2 = 1/(3B)$$

Figure 23B:
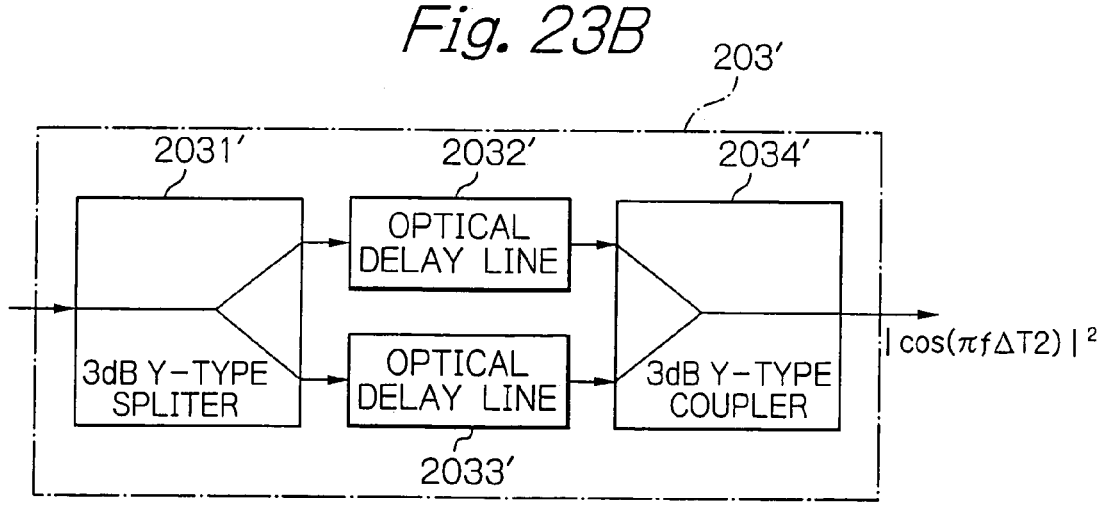

In FIG. 23B, which is a detailed configuration of a second example of the tap type optical filter 203' of FIG. 18, the optical splitter 2031' is formed by a 3 dB optical directional coupler, and the optical coupler 2034' is formed by a 3 dB optical directional coupler. In this case, a transmission function Q(f) is represented by the above-mentioned equation (5).

Therefore, in this case, $$\Delta T2 = 1/(3B)$$

Even in the optical transmitter of FIG. 18, since the spectrum bandwidth of a main lobe is relatively small, the optical spectrum of neighboring channels may be hardly superposed onto each other in WDM systems, so that the neighboring channels hardly interfere with each other. Also, since the waveform distortion caused by a synergistic effect between wavelength dispersion of the optical fiber and non-linear effects such as self-phase modulation (SPM) and cross-phase modulation (XPM) is further suppressed, the launched power from the transmitter can be set to be relatively large compared with the optical transmitter of FIG. 4, which would further upgrade the transmission speed characteristics and further increase the transmission distance. Further, the adjustment of phase and amplitude of the clock signal and the adjustment of a bias voltage are very easy.

Figure 24A:
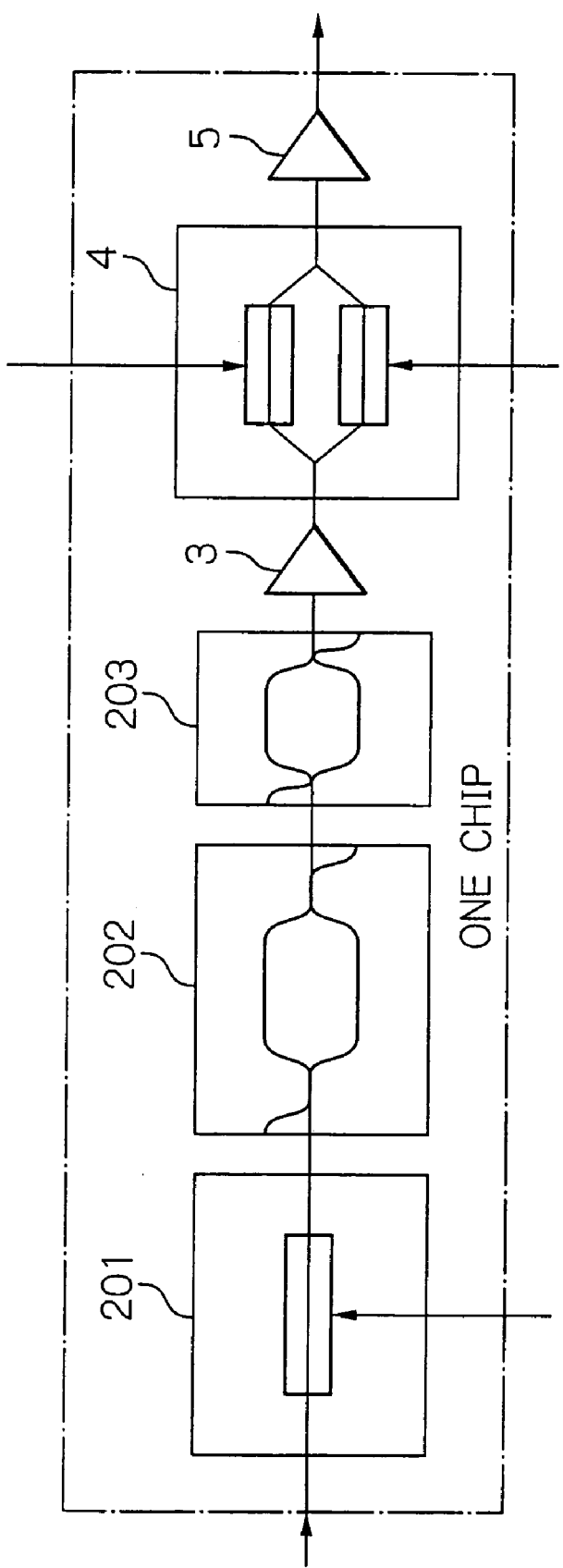
FIG. 24A is a block diagram illustrating one chip forming the clock modulator and data modulator of FIG. 18.

In the optical transmitter of FIG. 18, since the tap type filters 202' and 203' can be formed on a substrate made of $LiNbO_3$ or $LiTaO_3$, the clock modulator 2 and the data modulator 4 can be integrated into one substrate made of $LiNbO_3$ or $LiTaO_3$, as illustrated in FIG. 24A.

Figure 24C:
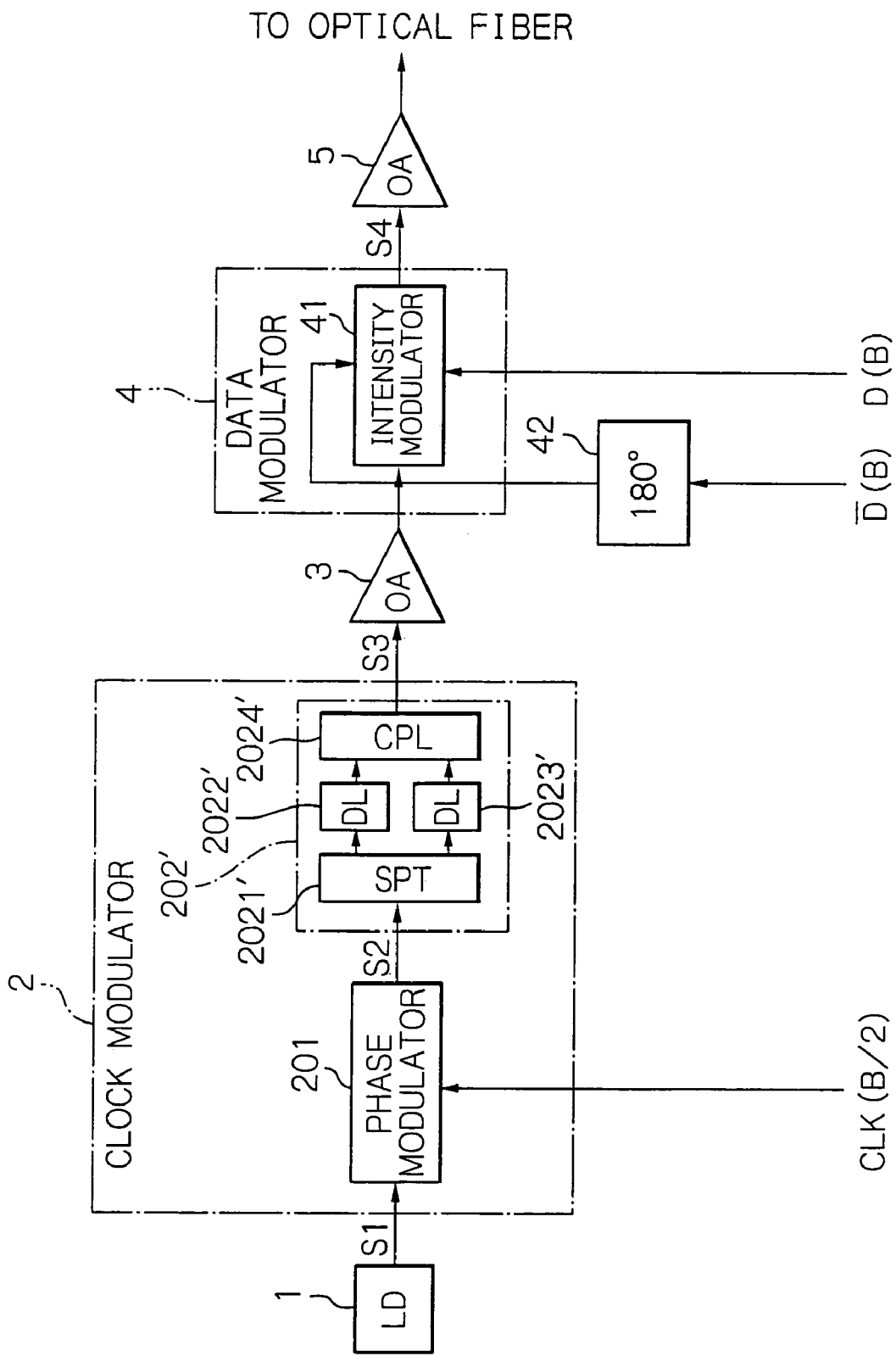

In the optical transmitter of FIG. 18, the tap type filter 203' can be provided at a prestage of the tap type filter 202'. Also, as illustrated in FIG. 24B, one of the tap type filters 202' and 203' can be provided at a post stage of the data modulator 4. Further, as illustrated in FIG. 24C, one of the tap type filters 203' and 204' can be omitted.

Additionally, although the intensity modulator 41 is constructed by a push-pull type Mach-Zehnder modulator, the intensity modulator 41 can be constructed by a single-end type Mach-Zehnder modulator or an electro-absorption modulator.

As explained hereinabove, according to the present invention, a clock modulator and a data modulator can be integrated into one substrate.

The invention claimed is:

1. An optical transmitter comprising:
   a continuous wave optical source for generating an optical signal having a carrier frequency component;
   a clock modulator for performing a clock modulation upon said optical signal using a clock signal to generate a clock-modulated signal including first double-sideband components and suppressing at least said carrier frequency component; and
   a data modulator for performing a data modulation upon said clock-modulated signal using a data signal, said clock signal having a half frequency of that of said data signal,
   wherein said clock modulator comprises a single-end phase modulator for performing said clock modulation upon said optical signal using said clock signal to generate a phase-modulated signal, and a first tap type optical filter for suppressing said carrier frequency component and 2n-th (n=1, 2, . . . ) double-sideband components of said phase-modulated signal to generate said clock-modulated signal, and
   wherein said clock modulator and said data modulator are on a single same substrate.

2. The optical transmitter as set forth in claim 1, wherein said first tap type optical filter comprises:
   an optical splitter for splitting an input optical signal into a pair of optical signals;
   an optical coupler for coupling said pair of optical signals into an output optical signal; and
   at least one optical delay line interposed between at least one output of said optical splitter and said optical coupler, so that a transmission function K(f) is represented by $|K(f)|^2 = |\sin(\Pi f \Delta T1)|^2$ where f is a relative frequency component with reference to said carrier frequency component, and
   $\Delta T1$ is a difference in delay time between inputs of said optical coupler due to said optical delay line, and is 1/B where B is a bit rate of said data signal.

3. The optical transmitter as set forth in claim 2, where said optical splitter comprises a 3 dB optical directional coupler, and said optical coupler comprises a 3 dB optical directional coupler.

4. The optical transmitter as set forth in claim 1, wherein said clock modulator further comprises a second tap type optical filter for suppressing 3n-th (n=1, 2, . . . ) double-sideband components of said phase-modulated signal.

5. The optical transmitter as set forth in claim 4, wherein said second tap type optical filter comprises:
   an optical splitter for splitting an input optical signal into a pair of optical signals;
   an optical coupler for coupling said pair of optical signals into an output optical signal; and
   at least one optical delay line interposed between at least one output of said optical splitter and said optical coupler, so that a transmission function Q(f) is represented by $|Q(f)|^2 = |\sin(\Pi f \Delta T2)|^2$ where f is a relative frequency component with reference to said carrier frequency component, and
   $\Delta T2$ is a difference in delay time between inputs of said optical coupler due to said optical delay line, and is 2/(3B) where B is a bit rate of said data signal.

6. The optical transmitter as set forth in claim 5, where said optical splitter comprises a 3 dB optical directional coupler, and said optical coupler comprises a 3 dB optical directional coupler.

7. The optical transmitter as set forth in claim 1, wherein said clock modulator further comprises a second tap type optical filter for suppressing (6n−3)-th (n=1, 2, . . . ) double-sideband components, of said phase-modulated signal.

8. The optical transmitter as set forth in claim 7, wherein said second tap type optical filter comprises:
   an optical splitter for splitting an input optical signal into a pair of optical signals;
   an optical coupler for coupling said pair of optical signals into an output optical signal; and
   at least one optical delay line interposed between at least one output of said optical splitter and said optical coupler, so that a transmission function Q(f) is represented by $|Q(f)|^2 = |\cos(\Pi f \Delta T2)|^2$ where f is a relative frequency component with reference to said carrier frequency component, and
   $\Delta T2$ is a difference in delay time between inputs of said optical coupler due to said optical delay line, and is 1/(3B) where B is a bit rate of said data signal.

9. The optical transmitter as set forth in claim 8, where said optical splitter comprises a 3 dB optical directional coupler, and said optical coupler comprises a 3 dB optical directional coupler.

10. The optical transmitter as set forth in claim 8, where said optical splitter comprises a 3 dB Y-type optical splitter coupler, and said optical coupler comprises a 3 dB Y-type optical coupler.

11. An optical transmitter comprising:
    a continuous wave optical source for generating an optical signal having a carrier frequency component;
    a single-end phase modulator for performing a clock modulation upon said optical signal using a clock signal to generate a phase-modulated signal;
    a first tap type optical filter for suppressing said carrier frequency component and 2n-th (n=1, 2, . . . ) double-sideband components of said phase-modulated signal to generate a clock-modulated signal; and
    a data modulator for performing a data modulation upon said clock-modulated signal using a data signal, said clock signal having a half frequency of that of said data signal,
    wherein said single-end phase modulator, said first tap type optical filter, and said data modulator are on a single same substrate.

12. The optical transmitter as set forth in claim 11, wherein said first tap type optical filter comprises:

an optical splitter for splitting an input optical signal into a pair of optical signals;

an optical coupler for coupling said pair of optical signals into an output optical signal; and at least one optical delay line interposed between at least one output of said optical splitter and said optical coupler, so that a transmission function K(f) is represented by $$|K(f)|^2 = |\sin(\Pi f \Delta T1)|^2$$

where f is a relative frequency component with reference to said carrier frequency component, and ΔT1 is a difference in delay time between inputs of said optical coupler due to said optical delay line, and is 1/B where B is a bit rate of said data signal.

13. The optical transmitter as set forth in claim 12, where said optical splitter comprises a 3 dB optical directional coupler, and said optical coupler comprises a 3 dB optical directional coupler.

14. The optical transmitter as set forth in claim 11, further comprising a second tap type optical filter for suppressing 3n-th (n=1, 2, . . . ) double-sideband components of said phase-modulated signal.

15. The optical transmitter as set forth in claim 14, wherein said second tap type optical filter comprises:

an optical splitter for splitting an input optical signal into a pair of optical signals;

an optical coupler for coupling said pair of optical signals into an output optical signal; and at least one optical delay line interposed between at least one output of said optical splitter and said optical coupler, so that a transmission function Q(f) is represented by $$|Q(f)|^2 = |\sin(\Pi f \Delta T2)|^2$$

where f is a relative frequency component with reference to said carrier frequency component, and ΔT2 is a difference in delay time between inputs of said optical coupler due to said optical delay line, and is 2/(3B) where B is a bit rate of said data signal.

16. The optical transmitter as set forth in claim 15, where said optical splitter comprises a 3 dB optical directional coupler, and said optical coupler comprises a 3 dB optical directional coupler.

17. The optical transmitter as set forth in claim 14, wherein said second tap type optical filter is provided at a post stage of said first tap type optical filter.

18. The optical transmitter as set forth in claim 17, wherein said second tap type optical filter is provided between said single-end clock modulator and said data modulator.

19. The optical transmitter as set forth in claim 17, wherein said second tap type optical filter is provided at a post stage of said data modulator.

20. The optical transmitter as set forth in claim 14, wherein said second tap type optical filter is provided at a prestage of said first tap type optical filter.

21. The optical transmitter as set forth in claim 20, wherein said first tap type optical filter is provided between said single-end clock modulator and said data modulator.

22. The optical transmitter as set forth in claim 20, wherein said first tap type optical filter is provided at a post stage of said data modulator.

23. The optical transmitter as set forth in claim 11, further comprising a second tap type optical filter for suppressing (6n−3)-th (n=1, 2, . . . ) double-sideband components of said phase-modulated signal.

24. The optical transmitter as set forth in claim 23, wherein said second tap type optical filter comprises:

an optical splitter for splitting an input optical signal into a pair of optical signals;

an optical coupler for coupling said pair of optical signals into an output optical signal; and at least one optical delay line interposed between at least one output of said optical splitter and said optical coupler, so that a transmission function Q(f) is represented by $$|Q(f)|^2 = |\cos(\Pi f \Delta T2)|^2$$

where f is a relative frequency component with reference to said carrier frequency component, and ΔT2 is a difference in delay time between inputs of said optical coupler due to said optical delay line, and is 1/(3B) where B is a bit rate of said data signal.

25. The optical transmitter as set forth in claim 24, where said optical splitter comprises a 3 dB optical directional coupler, and said optical coupler comprises a 3 dB optical directional coupler.

26. The optical transmitter as set forth in claim 24, where said optical splitter comprises a 3 dB Y-type optical splitter coupler, and said optical coupler comprises a 3 dB Y-type optical coupler.

27. The optical transmitter as set forth in claim 23, wherein said second tap type optical filter is provided at a post stage of said first tap type optical filter.

28. The optical transmitter as set forth in claim 27, wherein said second tap type optical filter is provided between said single-end clock modulator and said data modulator.

29. The optical transmitter as set forth in claim 27, wherein said second tap type optical filter is provided at a post stage of said data modulator.

30. The optical transmitter as set forth in claim 23, wherein said second tap type optical filter is provided at a prestage of said first tap type optical filter.

31. The optical transmitter as set forth in claim 30, wherein said first tap type optical filter is provided between said single-end clock modulator and said data modulator.

32. The optical transmitter as set forth in claim 30, wherein said first tap type optical filter is provided at a post stage of said data modulator.

33. An optical transmitter comprising:

a continuous wave optical source for generating an optical signal having a carrier frequency component;

a clock modulator for performing a clock modulation upon said optical signal using a clock signal to generate a clock-modulated signal including said carrier frequency component and first double-sideband components and suppressing a part of other double-sideband components except for said first double-sideband components; and a data modulator for performing a data modulation upon said clock-modulated signal using a data signal, said clock signal having a half frequency of that of said data signal, wherein said clock modulator comprises, a single-end phase modulator for performing said clock modulation upon said optical signal using said clock signal to generate a phase-modulated signal, and at least one of first and second tap type optical filters, said first tap type optical filter suppressing (4n−2)-th (n=1, 2, . . . ) double-sideband components of said phase-modulated signal to generate said clock-modulated signal, said second tap type optical filter suppressing (6n−3)-th (n=1, 2, . . . ) double-sideband components of said phase-modulated signal to generate said clock-modulated signal, and wherein said clock modulator and said data modulator are on a single same substrate.

34. The optical transmitter as set forth in claim 33, wherein said first tap type optical filter comprises:
an optical splitter for splitting an input optical signal into a pair of optical signals;
an optical coupler for coupling said pair of optical signals into an output optical signal; and
at least one optical delay line interposed between at least one output of said optical splitter and said optical coupler, so that a transmission function K(f) is represented by $$|K(f)|^2 = |\cos(\Pi f \Delta T1)|^2$$

where f is a relative frequency component with reference to said carrier frequency component, and
$\Delta T1$ is a difference in delay time between inputs of said optical coupler due to said optical delay line, and is 1/(2B) where B is a bit rate of said data signal.

35. The optical transmitter as set forth in claim 34, where said optical splitter comprises a 3 dB optical directional coupler, and said optical coupler comprises a 3 dB optical directional coupler.

36. The optical transmitter as set forth in claim 34, wherein said optical splitter comprises a 3 dB Y-type optical splitter coupler, and a said optical coupler comprises a 3 dB Y-type optical coupler.

37. The optical transmitter as set forth in claim 33, wherein said second tap type optical filter comprises:
an optical splitter for splitting an input optical signal into a pair of optical signals;
an optical coupler for coupling said pair of optical signals into an output optical signal; and
at least one optical delay line interposed between at least one output of said optical splitter and said optical coupler, so that a transmission function Q(f) is represented by $$|Q(f)|^2 = |\cos(\Pi f \Delta T2)|^2$$

where f is a relative frequency component with reference to said carrier frequency component, and
$\Delta T2$ is a difference in delay time between inputs of said optical coupler due to said optical delay line, and is 1/(3B) where B is a bit rate of said data signal.

38. The optical transmitter as set forth in claim 37, where said optical splitter comprises a 3 dB optical directional coupler, and said optical coupler comprises a 3 dB optical directional coupler.

39. The optical transmitter as set forth in claim 37, where said optical splitter comprises a 3 dB Y-type optical splitter coupler, and said optical coupler comprises a 3 dB Y-type optical coupler.

40. An optical transmitter comprising:
a continuous wave optical source for generating an optical signal having a carrier frequency component;
a single-end phase modulator for performing a clock modulation upon said optical signal using a clock signal to generate a phase-modulated signal;
at least one first and second tap type optical filters,
said first tap type optical filter suppressing (4n−2)-th (n=1, 2, . . . ) double-sideband components of said phase-modulated signal to generate said clock-modulated signal, said second tap type optical filter suppressing (6n−3)-th (n=1, 2, . . . ) double-sideband components of said phase-modulated signal to generate said clock-modulated signal, and
a data modulator for performing a data modulation upon said clock-modulated signal using a data signal, said clock signal having a half frequency of that of said data signal,
wherein said single-end phase modulator, said first and second tap type optical filters, and said data modulator are on a single same substrate.

41. The optical transmitter as set forth in claim 40, wherein said first tap type optical filter comprises:
an optical splitter for splitting an input optical signal into a pair of optical signals;
an optical coupler for coupling said pair of optical signals into an output optical signal; and
at least one optical delay line interposed between at least one output of said optical splitter and said optical coupler, so that a transmission function K(f) is represented by $$|K(f)|^2 = |\cos(\Pi f \Delta T1)|^2$$

where f is a relative frequency component with reference to said carrier frequency component, and
$\Delta T1$ is a difference in delay time between inputs of said optical coupler due to said optical delay line, and is 1/(2B) where B is a bit rate of said data signal.

42. The optical transmitter as set forth in claim 41, where said optical splitter comprises a 3 dB optical directional coupler, and said optical coupler comprises a 3 dB optical directional coupler.

43. The optical transmitter as set forth in claim 41, wherein said optical splitter comprises a 3 dB Y-type optical splitter coupler, and said optical coupler comprises a 3 dB Y-type optical coupler.

44. The optical transmitter as set forth in claim 40, wherein said second tap type optical filter comprises:
an optical splitter for splitting an input optical signal into a pair of optical signals;
an optical coupler for coupling said pair of optical signals into an output optical signal; and
at least one optical delay line interposed between at least one output of said optical splitter and said optical coupler, so that a transmission function Q(f) is represented by $$|Q(f)|^2 = |\cos(\Pi f \Delta T2)|^2$$

where f is a relative frequency component with reference to said carrier frequency component, and
$\Delta T2$ is a difference in delay time between inputs of said optical coupler due to said optical delay line, and is 1/(3B) where B is a bit rate of said data signal.

45. The optical transmitter as set forth in claim 44, where said optical splitter comprises a 3 dB optical directional coupler, and said optical coupler comprises a 3 dB optical directional coupler.

46. The optical transmitter as set forth in claim 44, wherein said optical splitter comprises a 3 dB Y-type optical splitter, and said optical coupler comprises a 3 dB Y-type optical coupler.

47. The optical transmitter as set forth in claim 40, wherein, when both of said first and second tap type optical filters are provided, said second tap type optical filter is provided at a post stage of said first tap type optical filter.

48. The optical transmitter as set forth in claim 47, wherein said second tap type optical filter is provided between said single-end clock modulator and said data modulator.

49. The optical transmitter as set forth in claim 47, wherein said second tap type optical filter is provided at a post stage of said data modulator.

50. The optical transmitter as set forth in claim 40, wherein, when both of said first and second tap type optical filters are provided, said second tap type optical filter is provided at a prestage of said first tap type optical filter.

51. The optical transmitter as set forth in claim 50, wherein said first tap type optical filter is provided between said single-end clock modulator and said data modulator.

52. The optical transmitter as set forth in claim 50, wherein said first tap type optical filter is provided at a post stage of said data modulator.

53. An optical transmitter comprising:

a continuous wave optical source for generating an optical signal having a carrier frequency component;

a clock modulator for performing a clock modulation upon said optical signal using a clock signal to generate a clock-modulated signal including first double-sideband components and suppressing at least said carrier frequency component; and a data modulator for performing a data modulation upon said clock-modulated signal using a data signal, said clock signal having a half frequency of that of said data signal, wherein said clock modulator comprises a single-end phase modulator for performing said clock modulation upon said optical signal using said clock signal to generate a phase-modulated signal, and a first tap type optical filter for suppressing said carrier frequency component and 2n-th (n=1, 2, . . . ) double-sideband components of said phase-modulated signal to generate said clock-modulated signal, and wherein said clock modulator further comprises a second tap type optical filter for suppressing 3n-th (n=1, 2, . . . ) double-sideband components of said phase-modulated signal.

54. An optical transmitter comprising:

a continuous wave optical source for generating an optical signal having a carrier frequency component;

a clock modulator for performing a clock modulation upon said optical signal using a clock signal to generate a clock-modulated signal including first double-sideband components and suppressing at least said carrier frequency component; and a data modulator for performing a data modulation upon said clock-modulated signal using a data signal, said clock signal having a half frequency of that of said data signal, wherein said clock modulator comprises a single-end phase modulator for performing said clock modulation upon said optical signal using said clock signal to generate a phase-modulated signal, and a first tap type optical filter for suppressing said carrier frequency component and 2n-th (n=1, 2, . . . ) double-sideband components of said phase-modulated signal to generate said clock-modulated signal, and wherein said clock modulator further comprises a second tap type optical filter for suppressing (6n−3)-th (n=1, 2, . . . ) double-sideband components of said phase-modulated signal.

55. An optical transmitter comprising:

a continuous wave optical source for generating an optical signal having a carrier frequency component;

a single-end phase modulator for performing a clock modulation upon said optical signal using a clock signal to generate a phase-modulated signal;

a first tap type optical filter for suppressing said carrier frequency component and 2n-th (n=1, 2, . . . ) double-sideband components of said phase-modulated signal to generate a clock-modulated signal;

a data modulator for performing a data modulation upon said clock-modulated signal using a data signal, said clock signal having a half frequency of that of said data signal; and a second tap type optical filter for suppressing 3n-th (n=1, 2, . . . ) double-sideband components of said phase-modulated signal.

56. An optical transmitter comprising:

a continuous wave optical source for generating an optical signal having a carrier frequency component;

a single-end phase modulator for performing a clock modulation upon said optical signal using a clock signal to generate a phase-modulated signal;

a first tap type optical filter for suppressing said carrier frequency component and 2n-th (n=1, 2, . . . ) double-sideband components of said phase-modulated signal to generate a clock-modulated signal;

a data modulator for performing a data modulation upon said clock-modulated signal using a data signal, said clock signal having a half frequency of that of said data signal; and a second tap type optical filter for suppressing (6n−3)-th (n=1, 2, . . . ) double-sideband components of said phase-modulated signal.

* * * * *